(12) United States Patent
Gulati et al.

(10) Patent No.: US 11,030,236 B2
(45) Date of Patent: Jun. 8, 2021

(54) IMAGE SEARCHING BY EMPLOYING LAYERED SEARCH CONSTRAINTS

(71) Applicant: ADOBE INC., San Jose, CA (US)

(72) Inventors: Samarth Gulati, San Francisco, CA (US); Brett Butterfield, San Francisco, CA (US); Baldo Faieta, San Francisco, CA (US); Bernard James Kerr, Sausalito, CA (US); Kent Andrew Edmonds, San Jose, CA (US)

(73) Assignee: Adobe Inc., San Jose, CA (US)

( * ) Notice: Subject to any disclaimer, the term of this patent is extended or adjusted under 35 U.S.C. 154(b) by 180 days.

(21) Appl. No.: 15/824,836

(22) Filed: Nov. 28, 2017

(65) Prior Publication Data

US 2019/0163766 A1    May 30, 2019

(51) Int. Cl.
*G06F 16/583* (2019.01)
*G06F 16/532* (2019.01)
*G06F 16/56* (2019.01)
*G06F 16/9535* (2019.01)

(52) U.S. Cl.
CPC ........ *G06F 16/5838* (2019.01); *G06F 16/532* (2019.01); *G06F 16/56* (2019.01); *G06F 16/583* (2019.01); *G06F 16/9535* (2019.01)

(58) Field of Classification Search
CPC ............. G06K 9/00288; G06K 9/6253; G06K 9/6263; G06K 9/627; G06K 9/46; G06K 9/4628; G06K 9/6202; G06K 9/6215; G06K 9/623; G06K 9/6256; G06K 9/66; G06K 9/00456; G06K 9/6276; G06F 16/338; G06F 16/583; G06F 16/532; G06F 16/5838; G06F 16/2455; G06F 16/248; G06F 16/54; G06F 16/783; G06F 16/58; G06F 16/24578; G06F 16/35; G06F 40/30; G06F 16/287; G06F 3/04842

See application file for complete search history.

(56) References Cited

U.S. PATENT DOCUMENTS 8,345,982 B2 *   1/2013   Gokturk ............. G06Q 30/0603
                                                    382/190
8,751,530 B1 *   6/2014   Ioffe ..................... G06F 16/583
                                                    707/772

(Continued)

*Primary Examiner* — Yuk Ting Choi
(74) *Attorney, Agent, or Firm* — Shook, Hardy & Bacon, L.L.P.

(57) ABSTRACT

Systems and methods for searching digital content, such as digital images, are disclosed. A method includes receiving a first search constraint and generating search results based on the first search constraint. A search constraint includes search values or criteria. The search results include a ranked set of digital images. A second search constraint and a weight value associated with the second search constraint are received. The search results are updated based on the second search constraint and the weight value. The updated search results are provided to a user. Updating the search results includes determining a ranking (or a re-ranking) for each item of content included in the search results based on the first search constraint, the second search constraint, and the weight value. Re-ranking the search results may further be based on a weight value associated with the first search constraint, such as a default or maximum weight value.

20 Claims, 10 Drawing Sheets

(56) References Cited

U.S. PATENT DOCUMENTS

| | | | | |
|---|---|---|---|---|
| 9,280,565 | B1* | 3/2016 | Rizk | G06F 16/51 |
| | | | | 707/772 |
| 2007/0168357 | A1* | 7/2007 | Mo | G06F 16/9535 |
| | | | | 707/999.01 |
| 2011/0029561 | A1* | 2/2011 | Slaney | G06F 16/58 |
| | | | | 707/772 |
| 2011/0099191 | A1* | 4/2011 | Ghosh | G06Q 10/00 |
| | | | | 707/769 |
| 2012/0201468 | A1* | 8/2012 | Oami | G06K 9/00362 |
| | | | | 382/199 |
| 2014/0280180 | A1* | 9/2014 | Edecker | G06F 16/9535 |
| | | | | 707/740 |
| 2017/0249339 | A1* | 8/2017 | Lester | G06F 16/56 |
| | | | | 707/772 |
| 2018/0032581 | A1* | 2/2018 | Baldeschi | G06F 16/2457 |
| | | | | 707/769 |
| 2018/0089556 | A1* | 3/2018 | Zeiler | G06N 3/08 |
| | | | | 707/772 |
| 2018/0189325 | A1* | 7/2018 | Hohwald | G06F 3/04817 |
| | | | | 707/772 |

* cited by examiner

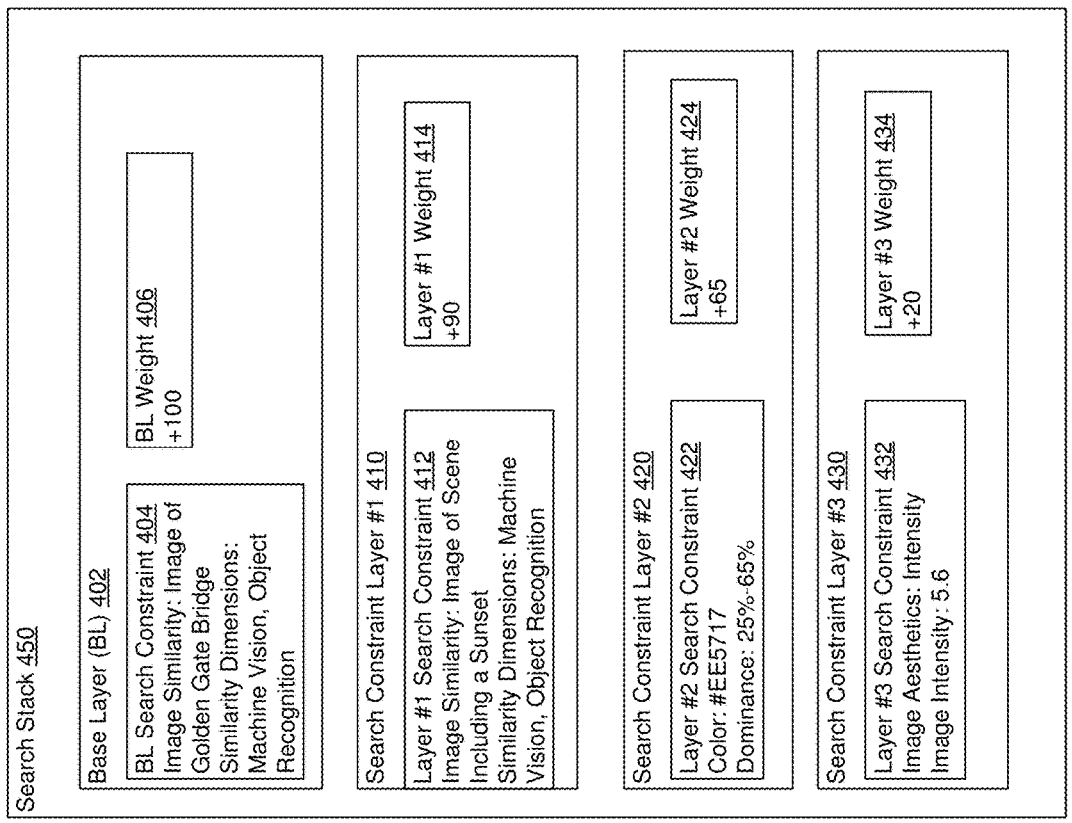
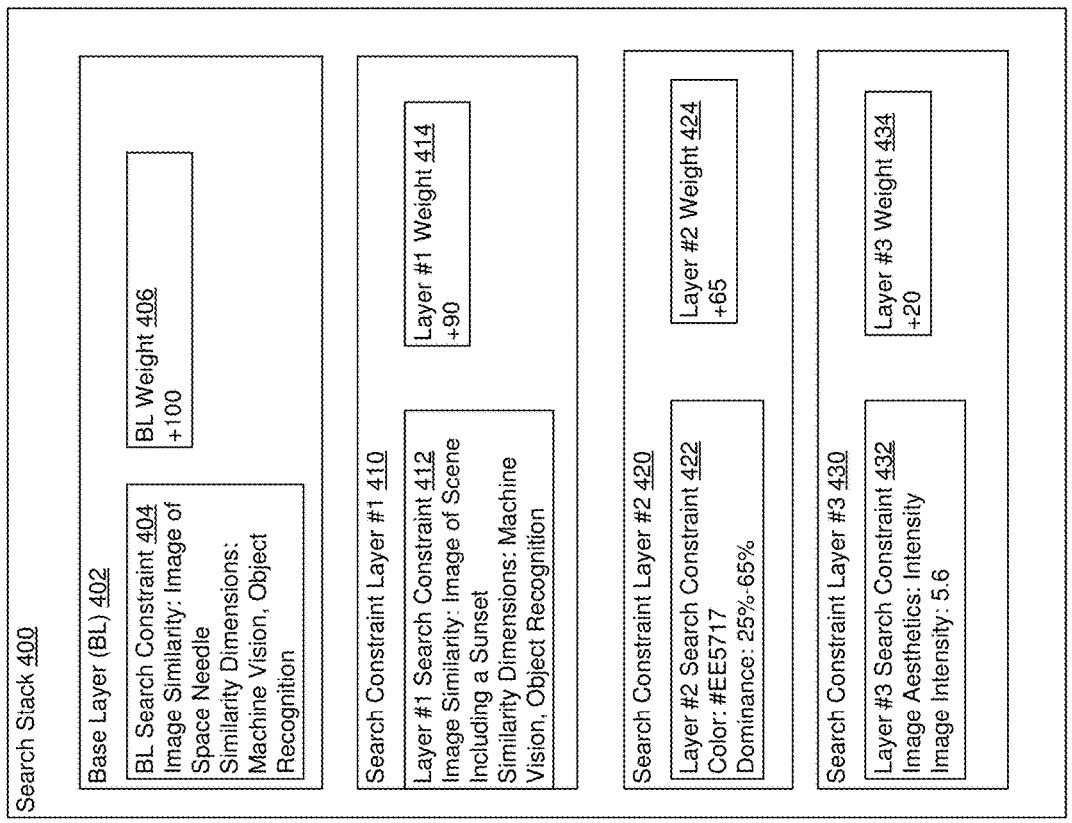
FIG. 4A
FIG. 4B

IMAGE SEARCHING BY EMPLOYING LAYERED SEARCH CONSTRAINTS

BACKGROUND

A growth rate for the volume of digital content collections is sometimes referred to as content velocity. For many forms of digital content, the content velocity and resulting content volume is significant. As an example, the ubiquity of camera-enabled mobile devices has enabled a staggering content velocity and content volume for private, as well as shared and/or public collections of digital images. Searching for relevant content within such voluminous collections is challenging.

Complex and/or highly dimensional content exacerbates such search challenges. For instance, searching within large collections of complex and highly dimensional digital content, such as digital images, is notoriously difficult at least because the structure of an image may be highly dimensional and include numerous explicit, as well as hidden/latent features. For instance, a user may wish to search over various portions of explicit (and/or latent or hidden) features of images, such as objects/persons depicted in the foreground and/or in the background of images, the color palette of the images, various aesthetic dimensions of the images, or the like. Conventional search techniques for image databases may be enabled for only a portion of the dimensions/features that are relevant to the user's needs, rely on extensive manual curation and/or annotation of the images, or be limited to the logical concatenation of search criteria, e.g., ANDing and/or ORing individual search criteria.

The automatic characterization of portions of an image's structure via techniques, such as machine vision and spectral analysis, has somewhat attenuated some of these difficulties. However, image search remains a challenging problem. Even if the user is able to identify multiple relevant search criteria (and the corresponding portions of the image structure are adequately characterized), the logical concatenation of multiple search criteria may result in over- or under-constrained search results, which limit the user's ability to locate relevant content. For instance, when the user provides too few (or overly broad) search criteria, the search results may be too large or diffuse to be of value. In contrast, if the user overly constrains the search criteria, the search may return a set that is too small or too narrow to be valuable. Even when a database includes numerous images that are relevant to at least some portion of the search criteria, conventional search engines may still return a null set for some search conditions.

SUMMARY

Embodiments of the present invention are directed towards enhanced systems and methods for searching digital content, such as but not limited to digital images. One such enhanced method includes receiving a first search constraint and generating search results based on the first search constraint. A search constraint may include one or more search values, search criteria, or search conditions. The search results may include a ranked (via a relevancy score) set of digital images. Each image included in the set of images may be embedded within a vector space. In addition, the search constraint may be mapped to a location or position, within the vector space The ranking or relevancy score of each image included in the set of digital images may be based on the image's position within the vector space with respect to the search constraint's position within the vector space.

For instance, each image included in the set of images may be embedded within a vector space. The search constraint may correspond to or be mapped to a location within the vector space. The ranking or relevancy score for a particular image included in the set of images may be based on a distance between the particular image and the search constraint, with the vector space.

More particularly, an image's relevancy for a particular search constraint may be based on the image's vector representation within the vector space, in comparison to a vector representation of the search constraint within the vector space. For instance, the relevancy score for a particular search constraint may be based on the components of the image's vector representation in comparison to the components of the search constraint's vector representation. A distance metric that indicates a distance between the vector representations of the image and the search constraint may be determined and employed to determine the relevancy score for the particular search constraint. A second search constraint and a weight value associated with the second search constraint are received. The search results are updated based on the second search constraint and the weight value associated with the second constraint. Similar to the first search constraint, the second search constraint corresponds to a location or position within the vector space. The location within the vector space that correspond to the first search constraint may be separate location from the location that corresponds to the second search constraint. The updated search results are provided to a user.

Updating the search results may include determining a ranking (or a re-ranking) for each item of content included in the search results. The ranking (or re-ranking) is based on the first search constraint, the second search constraint, and the weight value associated with the second search constraint. In at least one embodiment, updating the search results may further be based on a weight value associated with the first search constraint, such as a default weight value or a maximum weight value.

The method may further include determining a first ranking for the search results based on the first search constraint and determining a second ranking for the search results based on the second search constraint. The updated ranking for the search results is determined based on a combination of the first ranking, the second ranking, the weight value associated with the second search constraint, and the weight value associated with the first search constraint.

BRIEF DESCRIPTION OF THE DRAWINGS

FIG. 4A illustrates another search stack that is consistent with the various embodiments presented herein.

FIG. 4B illustrates still another search stack that is consistent with the various embodiments presented herein.

DETAILED DESCRIPTION

Figure 1A:
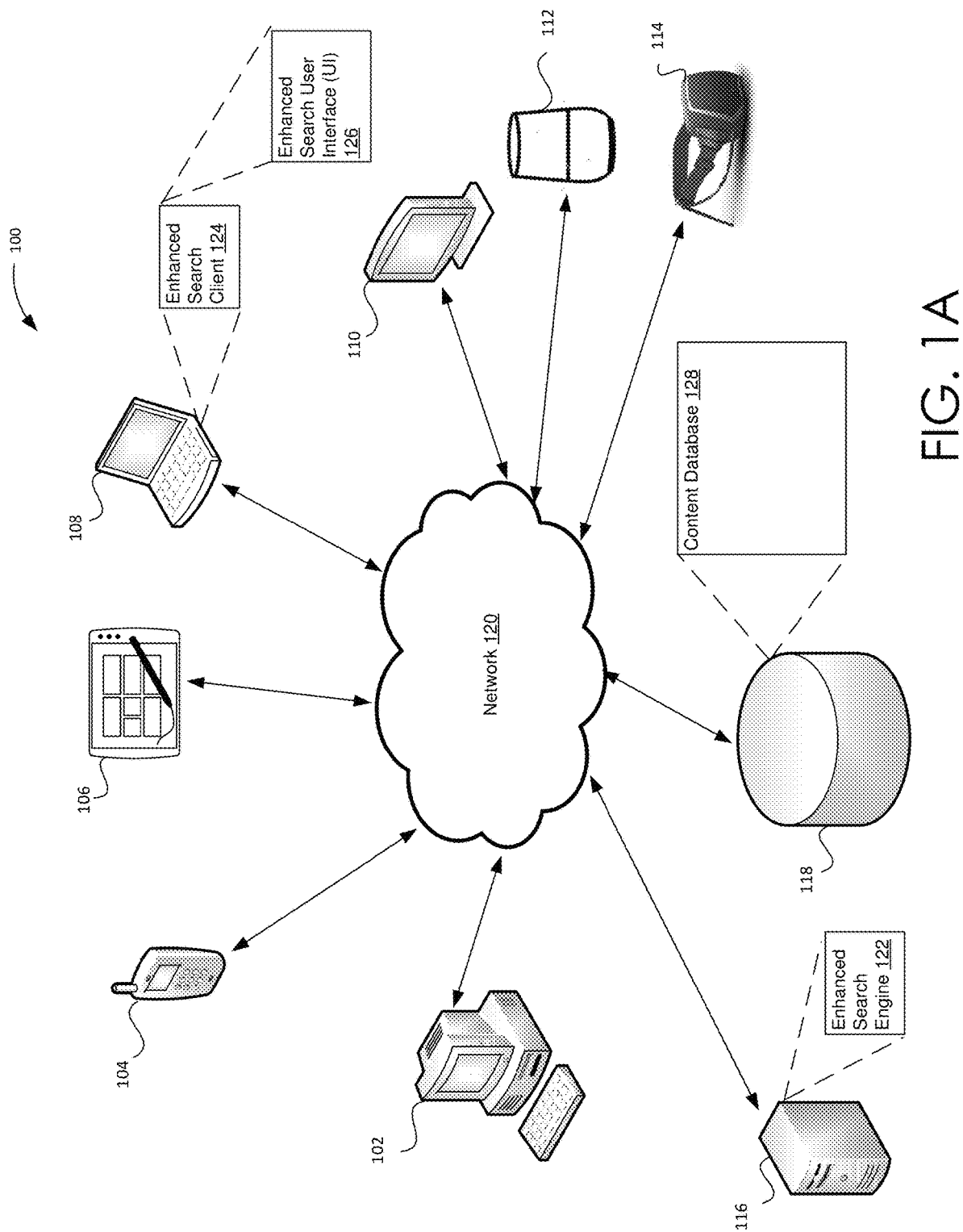
FIG. 1A illustrates an enhanced content search system implementing various embodiments presented herein.

Briefly stated, various embodiments are directed towards enhanced systems and methods for searching content based on multiple search constraints. In such embodiments, the multiple search constraints are arranged and configured in a stacked architecture, i.e., an enhanced search is based on a search stack that includes multiple search constraint layers. Each search constraint layer includes a search constraint and an associated weight. A search constraint may include one or more search criteria, search conditions, or search query values, such as a keyword or a natural language phrase that constrains the search. The weight associated with the search constraint is a numerical value that prioritizes the relevancy of the layer, relative to the other layers. The embodiments generate search results, including a ranking of items of content included in the search results, based on the search constraints and associated weights of each of the layers included in the search stack. More specifically, the embodiments are directed to enhanced search methods and paradigms the employ the layering (or stacking) of weighted search constraints. The layering of the search constraints is based on embedding the search constraints within a vector space. The layered search stack is embedded in the vector space based on a weighted superposition of the vector representations of the search constraints. Furthermore, the embodiments include an enhanced user interface (UI) that enables the user to define the search constraints, the weighting of the search constraints, and the layering (or stacking) of the weighted search constraints.

A search stack comprises at least a base layer that includes a base search constraint. In some embodiments, the weight of the base layer (i.e., the base weight) is set to a default value, such as a maximum weight. Thus, the base layer may be maximally prioritized, with respect to other search constraint layers of the stack. In other embodiments, the base layer may be similar to the other layers, in that the user may adjust a default base weight. In some embodiments, the enhanced systems and methods generate initial search results based on the base layer. The embodiments re-order or re-rank the initial search results based on the search constraints and associated weights of the other layers within the search stack, as well as the search constraint and the (adjustable or non-adjustable) weight of the base layer. Because each layer of the stack includes a weight (except for possibly the base layer), a user is enabled to adjust the relative relevancy and/or prioritization of each search constraint included in the stack. Furthermore, because additional layers of the stack (i.e., layers that are not the base layer) are not operationally equivalent to a search filter, but rather operate to rank a relevancy or priority of the search results, such additional layers do not overly narrow or constraint the search results. Thus, the enhanced embodiments do not result in search results with too few "hits."

Conventional search systems and methods, such as conventional image search engines, enable a user to enter natural language keywords and/or phrases to search for images relevant to the keywords and/or phrases. For instance, a conventional search engine may enable a user to enter the phrase "girl in rain wearing yellow." Depending on the image database searched, the conventional engine may return a ranked set of images, some of which may depict a feminine adolescent human wearing yellow clothing and embedded within a rainy scene. However, in contrast to the enhanced embodiments disclosed herein, such conventional engines may fail to enable a user to define or modify a relevancy (or priority) for the separate words within the searched phrase, in an analog-like fashion via the adjustment of a weight value.

Figure 2B:
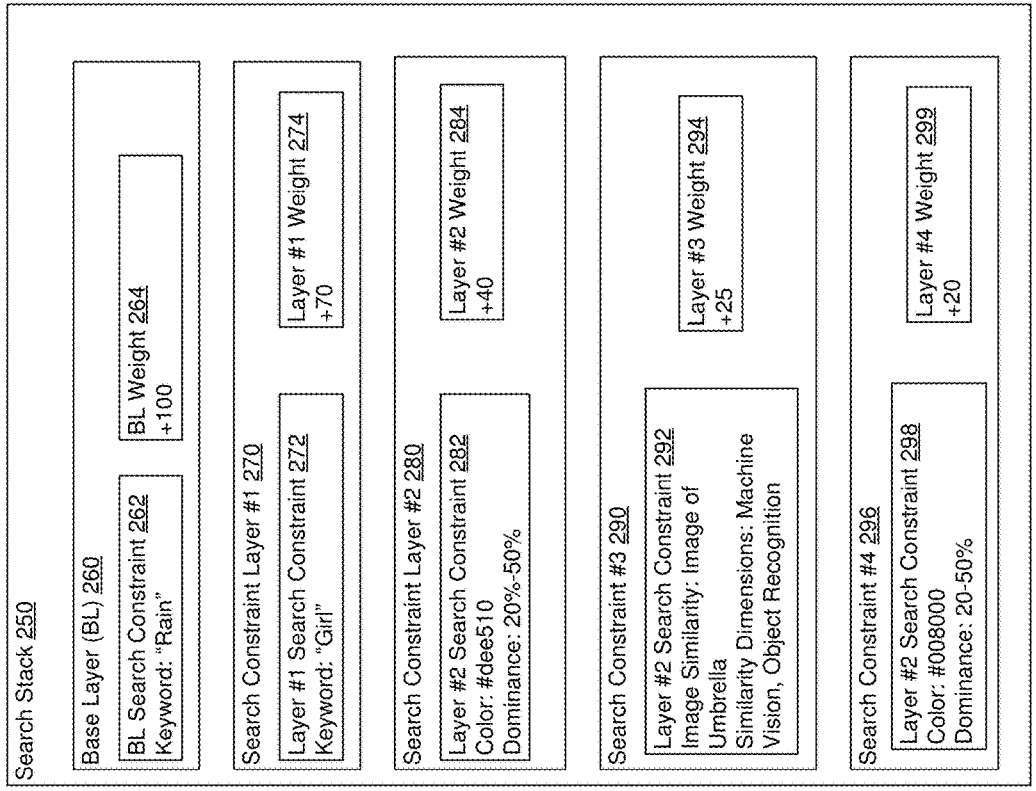
FIG. 2B illustrates a search stack that is consistent with the various embodiments presented herein.

As an example that is discussed in conjunction with FIG. 2B, via the enhanced embodiments disclosed herein, a user may define a search stack that includes a base layer with a keyword constraint of "rain," another layer with another keyword constraint of "girl," and still another layer with a color constraint of yellow (e.g., a hexadecimal value of #dee510). As discussed throughout, a color constraint may include a dominance value or range of values that is relevant to the percentage of pixels included in an image that are of a color at least similar to the color of the constraint. The weights of the layers may be varied in an analog-like fashion based on the relevancies to the user.

In the various embodiments, machine vision methods, such as but not limited to object, person, and/or feature recognition methods, may be employed to embed each image included in one or more image databases. For instance, a deep-learned neural network may detect explicit, hidden, and/or latent features of an image and embed that image within a vector space, where the basis vectors of the vector space are based on the detectable features. Each image may be indicated, represented, or encoded as a vector within the vector space. The components of an image's vector representation correspond to the detected features of the image. Furthermore, each search constraint discussed herein may correspond to one or more locations or positions within the vector space.

Each search constraint may correspond to one or more locations or positions within the vector space. Accordingly, for each search constraint, a relevancy score for a searched image may be determined based on the image's position within the vector space in comparison to the search constraint's position within the vector space, e.g., the image's relevancy score for that search constraint may be based on a distance between the image's vector representation and the search constraint's vector representation. In determining the ranked search results, a weighted-combination of the image's relevancy scores for each of the search constraints may be determined, wherein the search stack indicates the one or more search constraints.

Because the search stack includes one or more weighted search constraints, each represented by a vector within a vector space, the search stack may be represented by a weighted combination or superposition of the vectors representing the search constraints. The combination of the search constraint vectors may be weighted by each of the corresponding weights associated with the search constraint. That is, the search stack may be represented by a vector in the search space and corresponds to a location or position within the vector space. Accordingly, an image's ranking in the search results may be based on the distance between the image's vector representation in the vector space and the search stack's vector representation in the vector space. That is, the ranking of an image in the search results may be based on a distance between the image and the position or location of the search stack within the vector space. Thus, because the search stack may be determined based on a superposition or combination of weighted vectors, the layer or stacking of the search constraints may be based on combining or superposition vector representations of individual weighted search constraints within a vector space. That is, search content (e.g., images) and a layered search stack are embedded with a vector space, that classifies and/or characterizes each.

The enhanced embodiments employ such a search stack to return search results ranked based on the user-defined weights of the various layers. Thus, the enhanced embodiments disclosed herein enable a user to precisely define, via weight values, a relevancy for each of the search constraints. The weights provide a relative metric or measure for the ranking of the search results based on the relevancy or priority for the relative combinations of each of the additional search constraints with respect to the base search constraint. That is, by adjusting each of the weights, the user may control which aspects of the searched content are most relevant for the ranking of the search results, i.e. whether to prioritize the depiction of "a girl," "rain," "yellow," or "clothing" when ranking the search results.

As discussed below, because the possible value for the user assigned weights is greater than two possible values (e.g., "on" and "off"), the relevancy or priority of each search constraint may be adjusted in a somewhat analog fashion. In contrast, many conventional search systems enable a user to logically combine multiple search constraints via AND, OR, XOR, NAND, and NOR operations. Thus, the relative prioritizations of the search criteria in conventional search systems tend to be digital, i.e., each conventional search criteria is either fully "on" or fully "off." In the enhanced embodiments herein, the user may adjust the priority or relevancy of each individual search constraint layer in the search stack via the analog-like weight values for the layers.

Due to the digital-like nature of such conventional search systems, the resulting searches may be under or overly constrained. For instance, if the image database includes only a small number of images that depict a feminine adolescent human wearing yellow clothing and embedded within a rainy scene, a conventional search engine may return only a few images or "hits." Conventional systems may only return a few images even when the user has only a slight preference for yellow clothing over green clothing and the image database includes numerous images depicting a feminine adolescent human wearing green clothing and embedded within a rainy scene. In the analog-like embodiments of search systems disclosed herein, the user may quantify their preference for yellow clothing, as opposed to green clothing, via the weights. The user's search preferences are reflected in the ranking of the returned search results, rather than a filtered or decreased number of "hits" within the search results. For instance, the disclosed embodiments may return multiple images, wherein the topped rank images depict yellow clothing, but lesser ranked images depict green clothing.

In conventional search systems, problems associated with overly constrained searches become more significant when the number constraints increases and/or the scope of one or more individual constraints is narrowed. For instance, the search phrase employed in a conventional search system may be updated as "girl in rain wearing yellow and using an umbrella." If the image database does not include any images depicting a feminine adolescent human that is wearing green clothing, embedded within a rainy scene, and using an umbrella, the conventional search system may return a null set for the search results. However, as discussed in conjunction with FIG. 2B, the user may update the search stack to include another search constraint layer that includes an image similarity type search constraint, via the selection of an image (via a search user interface (UI)) of an image depicting an umbrella, and providing an appropriate weight. Alternatively, the additional layer could include a keyword type constraint that includes the keyword "umbrella." Based on search stack 250 of FIG. 2B, if the image database includes images depicting a feminine adolescent human that is wearing green clothing, embedded within a rainy scene, and using an umbrella, the embodiments will generate search results with such images ranked based on the weights of each of the layers. In contrast to some conventional search systems, when the image database does not include such images, the embodiments herein will not generate a null, or culled, set for the search results.

Some conventional search engines may ignore search criteria that limit the search results to a very limited or null set. However, such conventional search systems may not enable the user to control the relevancy or priority of each search constraint in an analog-like fashion via the layering of search constraints within a stack, where the user may adjust the weight of each layer via an analog-like weight value.

In general, the embodiments discussed herein generate search results such that content that is relevant to the search constraints of layers with higher weight values are more highly ranked than content that is relevant only to the search constraints of layers with lesser weight values. In some embodiments, the weight for each layer may be adjusted within a predefined range or scale. For example, a weight value may be constrained between a maximum and a minimum value, such as but not limited to +100.0 and −100.0. Negative weight values may indicate a logical NOT operation on the associated search constraint. For instance, content that is highly relevant to the search constraints of layers with negative weight values are ranked lower than content that is relevant to the search constraint of layers with positive weight values or negative weight values closer to 0.0. The weight values may be constrained to virtually any defined scale or range and need not include negative values.

Many of the various embodiments discussed herein are directed towards the search of digital image databases and/or collections. However, other embodiments are not so limited, and such embodiments may be employed to search any form of digital content, such as but not limited to digital audio (music and/or speech) content, video content, textual documents, multimedia content, and the like. Search constraint types for embodiments directed towards digital images may include textual search constraints such as natural language keywords, strings of keywords, search phrases, and the like that refer to various aspects on the images, such as objects and/or scenes depicted in images. Other search constraints may include, but are not limited to individual and/or combinations of images (e.g., search by example and/or image similarity search constraints), individual, and/or combinations of colors depicted within the images, and various aesthetic properties of images, such as hue, saturation, lightness, intensity, quantity, and such. Other types of search constraints may be included in layers, some of which are discussed throughout. In embodiments that additionally and/or alternatively search forms of digital content other than digital images, other types of search constraints may be employed, such as genre-related search constraints, as well as artist-related search constraints for video/audio digital content. As discussed throughout, an image similarity search constraint may include determining a "distance" between a vector representation of each image included in the search results and a vector representation of the example image. In at least one embodiment, the distance metric considers only a portion of the dimensions in the vector space that the images are embedded within. In some embodiments, the user may select the portion of dimensions within the vector space that are considered when determining a distance between elements within the vector space.

The various embodiments provide an enhanced search user interface (UI) that enables a user to define, edit, and manage the search stack. That is, via an intuitive UI, the user can add to, delete from, modify, edit, or otherwise update search constraint layers of the search stack. The UI enables a visual inspection of the updated ranking of the search results, in real time, as the user modifies/edits the search stack. The UI need not limit a number of layers a user may add to the stack. By editing the weights of one or more of the layers, the user may update the structure of the stack, i.e., the user may define not only an order of the relevancy (or priority) of the search constraints, but also a relative "distance" between the relevancy of the constraints by simply modifying the weights associated with the constraints. In addition to editing the weights, the UI intuitively enables the user to update a type and/or one or more values for each of the search constraints. The user may save and/or share a stack. For example, search stacks may be shared and/or traded amongst connections in a social network or platform. Accordingly, a user may save, share, access, re-use, and/or re-purpose previously saved/shared search stacks.

After accessing an already existing stack, the user may continue to modify the stack by editing, deleting, or modifying the layers. In addition to adding, deleting, or modifying layered search constraints, the user may apply various filters to the search results. For instance, the user may logically concatenate filters to be applied to the search results. In various embodiments, the user may toggle (i.e., enable and disable) the operability of the individual layers in the stack (as well as the filters) via binary "on/off switches" provided by the UI. That is, in order to visually inspect the effects of the separate layers on the ranking of the search results, in addition to adjusting the weight values of the layers in an analog-like fashion, the user may turn "off" and "on" (in a digital fashion), individual layers of the stack. Such features enable the user to visually inspect, in real time, the resulting re-ranking of the search results based on the weighting and the "on/off" state of each of the search constraint layers and filters. Additional aspects of the various embodiments will now be discussed.

Many embodiments for embedding search constraints and content within vector spaces, ranking weighted search results, graphical user interface features, and other technical implementation details that may be employed by the various embodiments herein, are discussed within U.S. patent application No. 15/824,907, entitled AUTOMATICALLY CURATED IMAGE SEARCHING, and filed on Nov. 28, 2017, the entirety of the contents of which are herein incorporated by reference.

Example Operating Environment

FIG. 1A illustrates an enhanced content search system 100 implementing various embodiments presented herein. Search system 100 includes one or more of various user computing devices, such as but not limited to desktop 102, smartphone 104, tablet 106, laptop 108, smart TV 110, virtual assistant (VA) device 112, and virtual reality (VR) and/or augmented reality (AR) headset 114. Other embodiments may include additional and/or alternative user computing devices. In other embodiments, system 100 may include more or less user computing devices. For instance, system 100 may include additional mobile devices, wearable devices, and the like. Any user computing device, such as but not limited to user-computing devices 102-114 may be enabled to provide at least portions of the discussed enhanced search services.

System 100 may also include server computing device 116. An exemplary, but non-limiting embodiment of a user computing device is discussed in conjunction with at least computing device 900 of FIG. 9. That is, at least structures, functionalities, or features of computing device 900 may be included in any of user computing devices 102-114 and/or server computing device 116. System 100 may include one or more storage devices, such as but not limited to storage device 118.

A general or specific communication network, such as but not limited to communication network 120, may communicatively couple at least a portion of user-computing devices 102-114, server computing device 116, and storage device 118. Communication network 120 may be any communication network, including virtually any wired and/or wireless communication technologies, wired and/or wireless communication protocols, and the like. Communication network 120 may be virtually any communication network that communicatively couples a plurality of computing devices and databases in such a way as to computing devices to exchange information via communication network 120.

Storage device 118 may include volatile and non-volatile storage of digital data. Storage device 118 may include non-transitory storage media. Communication network 120 may communicatively couple storage device 118 to at least a portion of user-computing devices 102-114 and/or server computing device 116. In some embodiments, storage device 118 may be a storage device distributed over multiple physical storage devices. Thus, storage device 114 may be a virtualized storage device. For instance, one or more "cloud storage" services and/or service providers may provide, implement, and/or enable storage device 118. Such cloud services may be provided by a third party.

Any computing device of system 100, such as but not limited to any one or more of user computing devices 102-114 or server 116, may execute, host, or otherwise enable the operation of enhanced search engine 122. Similarly, any computing device, such as but not limited any one or more of user computing devices 102-114 or server 116, may execute, host, or otherwise enable the operation of enhanced search client 124. In some non-limiting embodiments, search engine 122 provides enhanced search services to search client 124 over communication network 120. Enhanced search client 124 provides an enhanced search user interface (UI) 126 so that a user of the computing device hosting search client 124 may control, define, manipulate, edit, or otherwise receive the enhanced services of search engine 122. Various embodiments of search UI are discussed in conjunction with FIG. 3. In some embodiments, engine 122 and client 124 are implemented on the same computing device. In at least one embodiment, a server-client architecture, such as the server-client architecture shown in FIG. 1A is not employed.

Storage device 118 may store one or more content databases, such as content database 128. Content database 128 may store one or more collections of content and/or metadata associated with the content included in one or more content collections. Search engine 122 may search the content and/or content metadata included in content database 128. Various non-limiting embodiments of a content database that may be searched via search engine 122 are discussed in conjunction with FIG. 1B.

Example Content Database

Figure 1B:
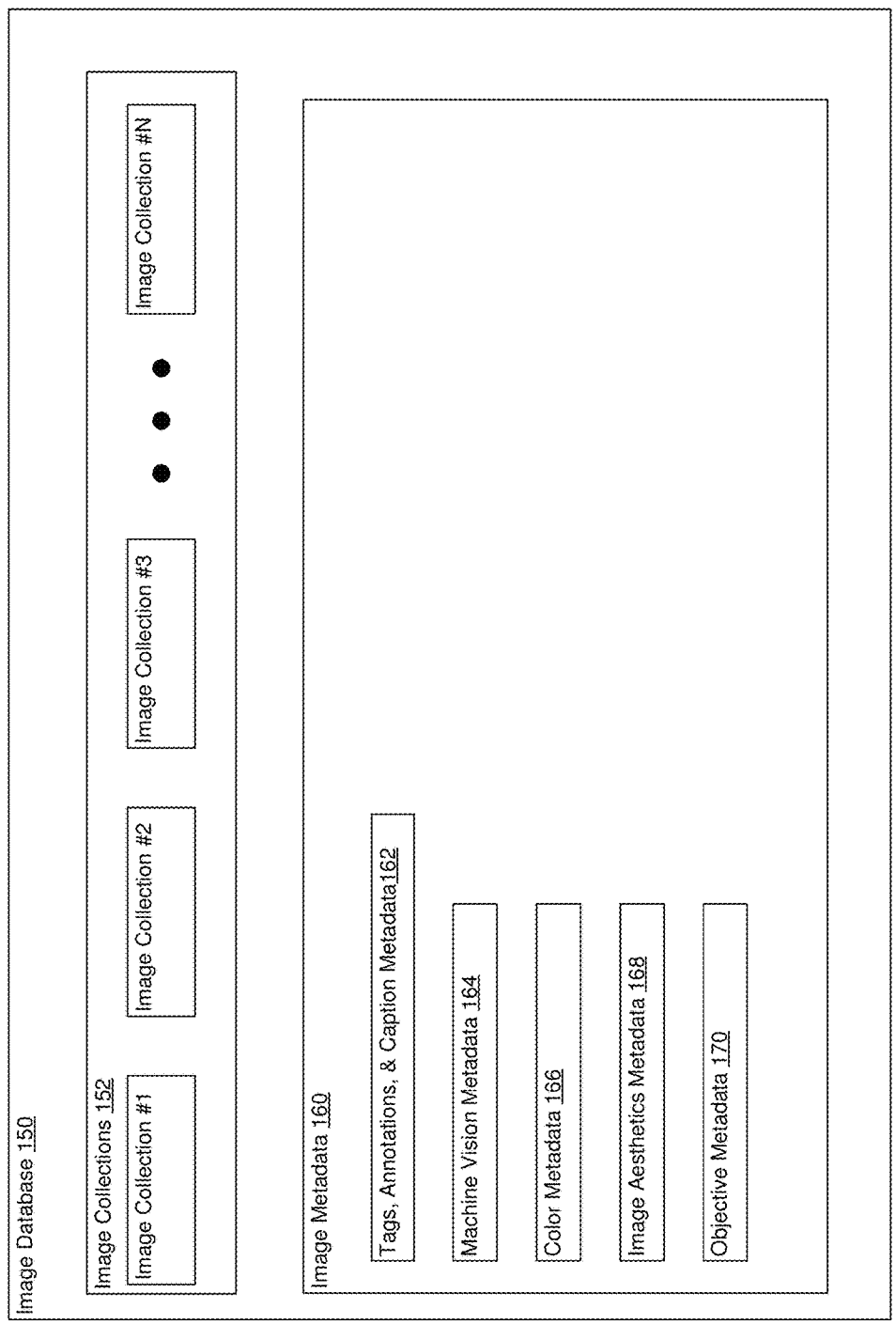
FIG. 1B illustrates one embodiment of an image database employable in the enhanced content search system of FIG. 1A.

FIG. 1B illustrates one embodiment of an image database 150 employable in the enhanced content search system of FIG. 1A. As a non-limiting example, content database 128 of FIG. 1A may include similar data and/or features to that of image database 150. Image database 150 is a non-limiting embodiment of a content database that is searchable by the enhanced search system 100 of FIG. 1A. In addition to image database 150, system 100 may search digital audio databases, digital video databases, digital multimedia databases, textual document databases, and the like. Image database 150 may include image collections 152 that comprise one or more collections of images, such as image collection #1, image collection #2, image collection #3, and image collection #N, where N is any positive integer. The image collections may be private collections, public collections, shared collections, or the like. A user may individually select, via a search UI, such as search UI 300 of FIG. 3, one or more such collections to search. The selectable collections may be limited based on the user's credentials and privacy configurations for the collections. Such image collections may include folders of digital images, sets of digital images, sequences of digital images, or the like.

Various forms of image metadata 160 may be associated with each image included in searchable image database 150. Image metadata 160 includes any data that is associated with an image included in image database 150. Such metadata may at least partially characterize the associated image such that image metadata 160 may be employed in a search, via enhanced search engine 122 of FIG. 1A. That is, image metadata 160 may include any data that indicates and/or encodes any feature, structure, property, state, configuration, or other characterization of the associated image. As discussed throughout, the various types of search constraints included in a search stack may target various forms of the (structured or unstructured) image characterizing metadata included in image metadata 160. For example, search engine 122 may determine a relevancy of an image based on the metadata associated with the image, as well as one or more search constraints included in a search stack provided to search engine 122.

As discussed throughout, a user may manually provide and/or generate at least portions of image metadata 160. As a non-limiting example, a user that submits the associated image to the image database 150 may also provide portions of the associated image metadata 160. Automated techniques, such as but not limited to various forms of image analysis or machine-assisted image characterization, may generate other portions of image metadata 160. For example, machine vision based on one or more convolutional and/or deconvolutional neural networks may be employed to generate portions of image metadata 160. That is, machine learning, including deep learning via neural networks with many layers, may be employed to generate metadata that characterizes various aspects or properties of an image. As discussed below, such machine-assisted image characterizations may include employing one or more learned networks to embed an image within a vector space. The determination and/or quantification of any of the various image metadata 160 discussed herein may be based on an image's position within the vector space.

Image metadata 160 may include various forms of textual metadata, including tags, annotations, and image caption metadata 162. Such textual metadata may indicate, represent, or otherwise encode various structures, aspects, characteristics, or other properties of the associated image. For instance, textual metadata may include keyword tags of objects, persons, scenes, locations, or the like depicted within the associated image. Image analysis, machine vision, or deep learned neural networks may be employed to automatically generate portions of textual metadata. As an example, a deep-learned neural network may be trained to recognize objects, persons, locations, scenes, and the like depicted with an image via embedding the image within a vector space. Various forms of textual metadata may automatically be generated based on such machine vision techniques. As noted above, at least portions of the textual metadata may be manually provided via a user. For instance, users may manually provide textual metadata for images included in image database 150, such as keyword tags, annotations, captions (e.g., natural language descriptions of the image), and the like associated with an image.

In addition to the textual metadata generated via machine vision, other machine vision metadata 164 may be included in image metadata 160. For instance, machine vision metadata 164 may include various hidden or latent features of an image determined via neural networks, or other image analysis techniques. Machine vision metadata 164 may include one or more data structures, such as a vector embedded within a searchable space. The vectors may represent hidden and/or latent features determined and/or recognized in a machine-vision analysis. Such vectors are employable to determine a "distance" between any two images for an image similarity, or search by example, search constraints.

More particular, in the various embodiments, each searchable image may be embedded within a vector space and machine vision metadata 164 for an image may include the data encoding the image's location within the vector space. That is, machine vision metadata 164 may include the image's components for each dimension within the vector space. The vector space may be a highly dimensional and/or an abstract vector space. Thus, machine vision metadata 164 may include a highly-dimensional vector indicating the image's position within the vector space.

Various methods of image analysis and/or machine vision may be employed to embed the image within the vector space. For instance, a deep-learned convolutional neural network may be employed to embed an image within the vector space. Supervised and/or unsupervised learning methods may be employed to train a neural network to detect and/or recognize various explicit, latent, and/or hidden features within an image. The basis of the vector space may correspond to the various detectable explicit, latent, and/or hidden features.

Such detectable features may map onto or correspond to the various search constraint types discussed herein. For instance, a combination of such detectable features within an image may signal a likelihood or probability that the image depicts a particular person, object, location, or scene within a particular position of the image. A combination of detected features may be indicative of any of the image properties discussed herein, such as but not limited to aesthetics values, colors, various objective properties of the image, and the like. The image's position within the vector space may be employed to recognize, via machine vision, the image's objects, locations, persons, scenes, colors, image aesthetics, and the like. Accordingly, the other metadata discussed herein, including but not limited to tags, annotations, and caption metadata 162 may be determined based on the image's position within a highly-dimensional abstract vector space, i.e., tags, annotation, and caption metadata 162 may be based on machine vision metadata 164. Similarly, the determination of color metadata, image aesthetics metadata 168, and objective metadata 170 may be based on machine vision metadata 164.

Image metadata 160 may include color metadata 166. Color metadata 166 may include the pixel distribution for various colors or grayscale values depicted within the pixels of an image. As a non-limiting example, color metadata 166 associated with an image may indicate that 25% of the pixels of an associated image depict color_A, 65% of the pixels depict color_B, and 10% of the pixels depict color_C. At least portions of color metadata 166 may be generated automatically via image analysis.

Image metadata 168 may include various forms of image aesthetics metadata 168. Image aesthetics metadata 168 may include any data characterizing and/or indicating various aesthetic properties of an image, such as but not limited to hue, saturation, lightness, brightness, intensity, quantity, and the like. At lease portions of the image aesthetics metadata 168 may be generated automatically, e.g., based on the image's position within a vector space.

Image metadata 160 may include additional metadata, such as but not limited to objective metadata 170. Objective metadata 170 may include various metadata such as date and/or timestamps associated with the image, the geolocation of a camera device that captured the image, or an identifier of the photographer, author, or artist that created image. Such other objective metadata 160 may include an identifier (e.g., a MAC address, an IP address, or the like) of the camera device, settings/configurations/modes of the camera device (e.g., fast0burst mode, filter settings, flash configurations, or the like), configurations of lenses or other optical components used to generate the image, and the like. The examples discussed herein of metadata included in image metadata 160 are non-exhaustive, and image metadata may include other various forms of metadata that at least partially indicates any property or characterization of the associated image. More generally, any database searched via the enhanced searched systems and methods discussed herein may include any (structured or unstructured) metadata that encodes and/or represents any feature, property, function, aspect, or characteristic of the associated content.

Example Search Constraint Layer

Figure 2A:
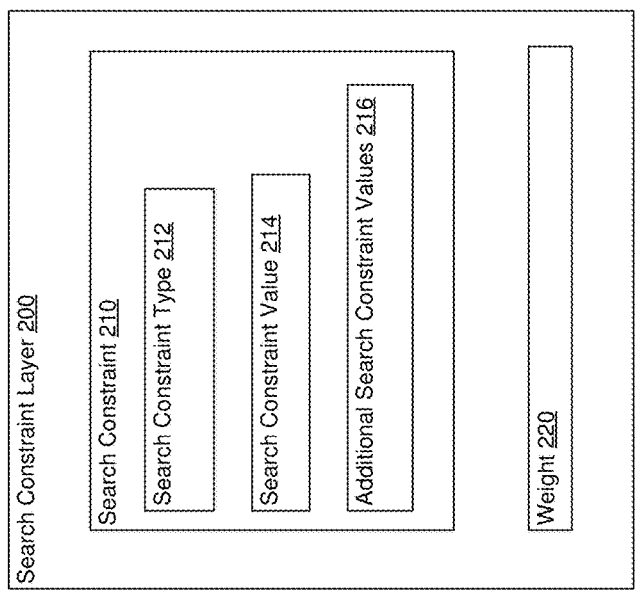
FIG. 2A illustrates a search constraint layer that is consistent with the various embodiments presented herein.

FIG. 2A illustrates a search constraint layer 200 that is consistent with the various embodiments presented herein. Search constraint layer 200 may be included in any of the various search stacks discussed herein, including but not limited to search stack 250 of FIG. 2B, search stack 400 of FIG. 4A, and/or search stack 450 of FIG. 4B. Search constraint layer 200 is a non-limiting embodiment of a search constraint layer employable in any of the search stacks discussed herein. That is search stacks 250/400/450 may include one or more search constraint layers with different, separate, and/or alternative features to those included in search constraint layer 200. Search constraint layer 200 may be a base layer search constraint, or any other additional search constraint layer included in a search stack.

For instance, each of base layer 260 of FIG. 2B or search constraint layer #1 270 of FIG. 2B may be similar to search constraint layer 200.

Search constraint layer 200 includes a search constraint 210 and a weight 220. Search constraint 210 may include one or more of a search constraint type 212, a search constraint value 214, and additional search constraint values 216. Search constraint type may include a type of the search constraint, such as but not limited to a keyword, a natural language phrase or text, image similarity, color, various aesthetic types, or various objective properties or characteristics of digital content, such as but not limited to an image. A search constraint type may include any type of metadata or otherwise characterizing data associated with an item of digital content. As such, objective properties of an image may include but are not limited to a geolocation or date/time that the image was generated at or on, the photographer/author/artist that generated the image, a specific camera device and/or camera device configuration or setting that was used to generate the image, or the like.

Search constraint value 214 may be a value corresponding to the type of the search constraint. Search constraint value 214 may be a numerical value or a natural language value such as a token or sequence of tokens (i.e., a natural language phrase). In various embodiments, search constraint value 214 may include an indication of a sample or example digital content, e.g., a link or a path to a file that includes the sample digital content. In some embodiments, the search constraint type 212 and the search constraint value 214 may serve as a field-value pair, where the search constraint type 212 is the field and the search constraint value is the value of the field-value pair. For instance, if the search constraint type 212 is keyword, the search constraint value 214 may be a value for the keyword, such as "rain," "girl," or the like.

For image similarity or search by example type search constraints, the search constraint value 214 may include an indication of the example image for the similarity analysis, e.g., a path or link to a file that includes the example image. For example, a similarity metric for the image and the example image may be determined based on a "distance" between the image and the example image, wherein each of the image and the example image has been embedded within a vector space, as discussed throughout. The "distance" between the images may be determined between the images' position within the vector space. The smaller the distance between the two images, the more similar the images are, as indicated by the similarity metric. In at least one embodiment, the determination of the distance between a pair of images may consider only a subset or portion of the dimensions within the vector space. In other embodiments, the determination of the distance between the vector representations is based on each of the dimensions within the vector space. By way of a non-limiting example, the vector space may include 1000 dimensions.

Each image has a vector representation that indicates the image's location within the vector space. Any distance metric that indicates a distance between two vectors or locations within a vector space may be used to determine the distance between a pair of images. Such non-limiting examples of distance metrics include sum of absolute differences, sum of squared differences, mean absolute error, mean squared error, Euclidean distance, Manhattan distance, Chebyshev distance, Minkowski distance, and the like. In at least one embodiment, the determination of the distance metric is isolated to a portion of the dimensions of the vector space. For instance, the distance between any two images, for an image similarity search, may be determined based on a particular set of 10 of the 1000 dimensions of the vector space. In at least some embodiments, a user is enabled to select the subset or portion of the dimensions into which to calculate the similarity metric based on the distance between the example image and the search images.

If the search constraint type 212 is color, then the corresponding search constraint value 214 may be a value for the color. In some embodiments, the value may any value that encodes a color, such as but not limited to a hexadecimal color code, an RGB color code, a grayscale color code, or any other code that represents a color/grayscale for a pixel. If the search constraint type 212 is image similarity, the search constraint value 214 may be an image, an image file, a location of an image/image file, a link to the image/image file, a thumbnail of the image, or the like. For instance, the search constraint value may be the hexadecimal value of #dee510 encoding a specific shade of yellow. If the search constraint type 212 is a type of aesthetic, such as but not limited to hue, saturation, lightness, intensity, or quantity, the search constraint value 214 may be a numerical value indicating the value for the relevant hue level, saturation level, lightness level, or quantity level. If the search constraint type 212 is a natural language phrase, the corresponding search constraint value 214 may be "girl in the rain wearing yellow and using an umbrella."

Additional search constraint values 216 may include additional values that further constrain or limit the search constraint type 212 and/or the search constraint value 214. For example, if the search constraint type 212 is color, then additional search constraint values may include one or more values for a dominance for the color. A dominance may include a minimum and/or a maximum for an absolute or relative number of the image pixels to be of or similar to the color defined via the search constraint value 214. For instance, additional search constraint values 216 may include the relative range of 20%-50%. If the search constraint type 212 is image similarity, then additional search constraint values 216 may include one or more dimensions along which to determine a distance between the image included in the search constraint value 214 and an image in the searched database. Additional search constraint values 216 may indicate the similarity dimensions, such as but not limited to color values of the image, various aesthetic values of the image, or dimensions associated with machine vision, such as objects, persons, scenes, or locations depicted in the image. The examples of search constraint types and associated search constraint values discussed herein are non-limiting, and additional search constraints types/values may be employed in the various embodiments discussed throughout.

As discussed throughout, weight 220 may include a numerical value. In some embodiments, the weight value may be constrained between a maximum and a minimum numerical value. In some embodiments, the weight 220 may be constrained to include numerical values in the range of [−100, +100]. Other embodiments may include alternative ranges for weight 220 such as but not limited to [−1.0, +1.0], [0, +100], [0.0, +1.0], and the like.

Example Search Stack

FIG. 2B illustrates a search stack 250 that is consistent with the various embodiments presented herein. Search stack 250 is a non-limiting example of a layered search stack that may be used in the various search systems and methods discussed. Search stack 250 includes a base layer 260 and one or more additional search constraint layers, such as but not limited to search constraint layer #1 270, search constraint layer #2 280, search constraint layer #3 290, and search constraint layer #4 296. Each of the search constraint layers of search stack 250 may include similar features and/or properties to search constraint layer 200 of FIG. 2A.

As a non-limiting example, search stack 250 may be generated to search a content database, such as but not limited to image database 150 of FIG. 1B for images depicting a feminine adolescent human that is wearing yellow or green clothing, embedded within a rainy scene, and using an umbrella. As discussed below, search stack 250 enables the generation of search results that prioritize or ranks images where 20-50% of the pixels are yellow over images where 20-50% of the pixels are green.

Base layer 260 includes a keyword base layer search constraint 262 of "rain" and a base layer weight 264 of numerical value +100. In some embodiments, the weight of the base layer defaults to the maximum weight value. In some embodiments, the user may modify or adjust base layer weight 264, while in other embodiments, the user is not enabled to modify a default value of the base layer weight 264 and the base layer 260 is the most prioritized search constraint layer of search stack 250.

Search constraint layer #1 270 includes another keyword type search constraint 272 of "girl" and a layer #1 weight 274 of numerical value +70. Search constraint layer #2 280 includes a color type search constraint 282 of hexadecimal value #dee510 (for yellow), a dominance range of 20%-50%, and a layer #2 weight 284 of numerical value +40. Search constraint layer #3 290 includes an image similarity type search constraint 292, where the user has selected an example or sample image that depicts an umbrella and selected that similarity dimensions include machine vision and/or object recognition. That is, the search methods will determine the similarity (or "distance") of other images to the example image indicated via the search value based on depicted objects in the example image recognized via machine vision and/or object recognition. The numerical value for the layer #3 weight 294 is +25. For a search that the user wanted to insure that the top ranked search results did not include the girl using an umbrella, the user may adjust the numerical value for layer #3 weight to be a negative number.

Search constraint layer #4 296 includes another color type search constraint 298 of hexadecimal value #008000 (for green), a dominance range of 20%-50%, and a layer #4 weight 299 of numerical value +20. Accordingly, the ranking of the search results generated via search stack 250 will preference images with yellow pixels over images with green pixels. If the user preferred search results that prioritized the ranking of images with green pixels over images with yellow pixels, the user may employ a search user interface, such as search user interface 300 of FIG. 3, to adjust the relative weights 284/299 of layer #2 280 and layer #4 296.

Example Search User Interface

Figure 3:
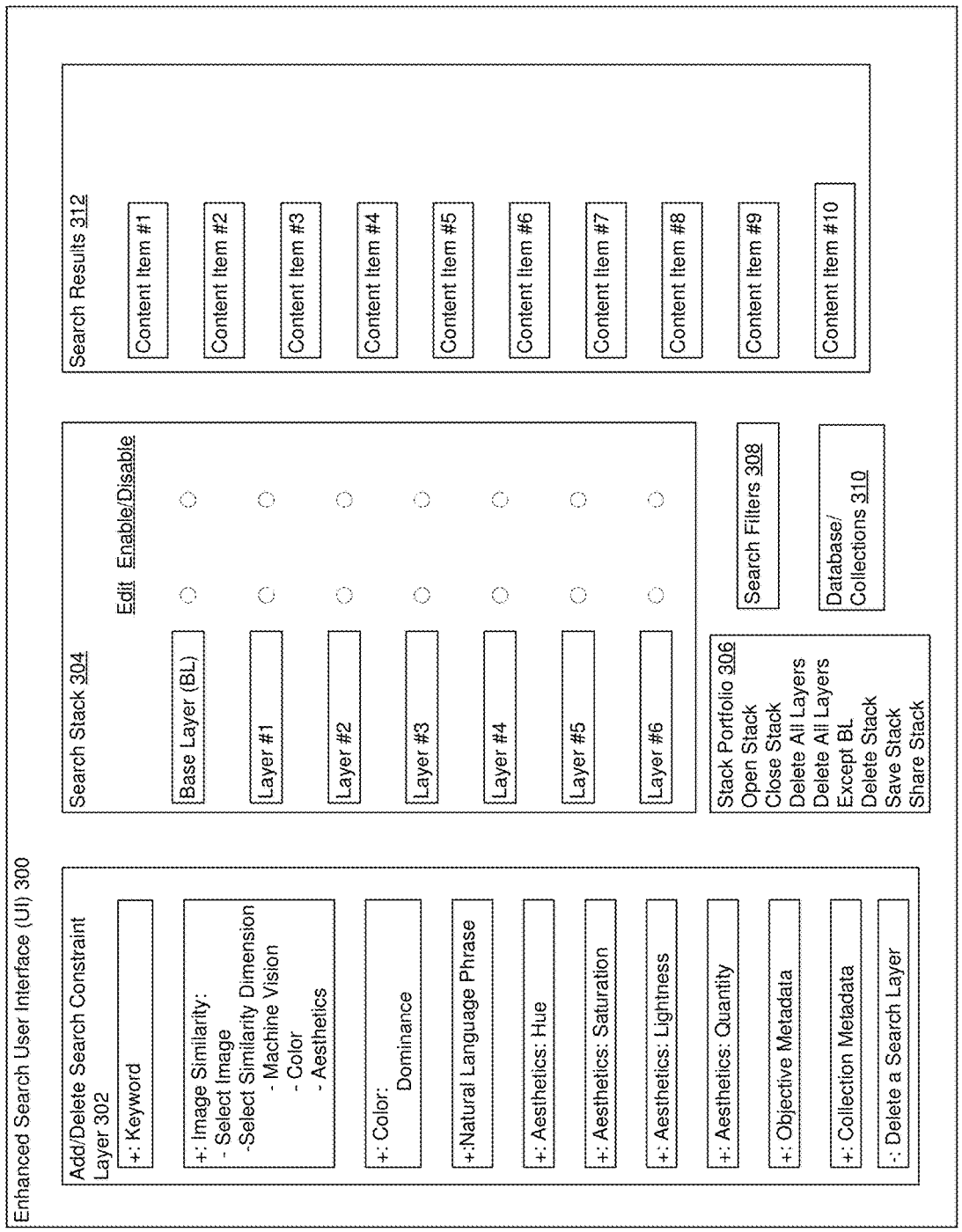
FIG. 3 illustrates a non-limiting embodiment of an enhanced search user interface provided by the content search system of FIG. 1A.

FIG. 3 illustrates a non-limiting embodiment of an enhanced search user interface (UI) 300 provided by the content search system of FIG. 1A. UI 300 may be provided to a user of a user computing device via a search client, such as but not limited to enhanced search client 124 of FIG. 1A. UI 126 of FIG. 1A may include similar features and/or functionality to that of UI 300. As such, UI 300 may enable a user to access search functionality from a search engine, such as but not limited to enhanced search engine 122 of FIG. 1A. UI 300, or a variant thereof, may be provided to a user of any user computing device, such as but not limited to any of user computing devices 102-114 of FIG. 1A.

UI 300 may be employed by the user to generate, edit, save, open, access, or share any of the various embodiments of search stacks discussed herein, including but not limited to search stack 250 of FIG. 2B, search stack 400 of FIG. 4A and search stack 450 of FIG. 4B. UI 300 includes an add/delete search constraint layer portion 302 that enables the user to add or delete individual layers to the editable search stack 304. Search stack 304 may be similar to at least one of search stacks 250, 400, or 450. Add/delete search constraint layer portion 302 may include capabilities to add additional search constraint layers to search stack 304. Editable search stack 304 may include buttons that enable the user to edit the various layers included in search stack 304. For instance, the user is enabled to edit the search constraint type, the weight, or any of the associated search constraint values on any one or more layers via UI 300. Search stack 304 may include buttons that enable the user to enable/disable (turn "on" and "off") the functionality of individual layers of search stack 304. The ranked search results 312 can be updated in real time as the user edits the layers, e.g. adds layers, deletes layers, edits the search constraint values/weights, and the like.

The user may apply search filter 308 to the search results 312. The user may select individual databases, collections, or folders of content 310 to search via UI 300. The user may also manage a portfolio of search stacks 306. For example, a user may open a previously created search stack, close the current search stack 304, delete all the layers in the current search stack 304, delete all the layers except for the base layer, delete the entirety of the search stack 304, save the search stack 304, or share the search stack 304. For example, the user may share a search stack with a connection via a social network or social platform.

FIG. 4A illustrates another search stack 400 that is consistent with the various embodiments presented herein. A user may generate or create search stack via a search UI, such as but not limited to search UI 126 of FIG. 1A or search UI 300 of FIG. 3. Search stack includes a base layer 402, search constraint layer #1 410, search constraint layer #2 420, and search constraint layer #4 430. Base layer includes a base layer search constraint 404 and a base layer weight 406. Base layer search constraint 404 is an image similarity type search constraint, where the search constraint value indicates an example image of the Space Needle located in Seattle, Wash. Base layer weight 406 is set to a default maximum value of +100.

Search constraint layer #1 410 includes another image similarity type search constraint 412 that indicates an example image of a scene that includes a setting sun, i.e. the example image depicts a sunset. The weight 414 of search constraint layer #1 410 is set, via the user, to a numerical value of +90. Search constraint layer #2 420 includes a color type search constraint 422 that indicates the color orange with a dominance window of 25%-65% of the included pixels and a weight 424 of +65. Search constraint layer #3 430 includes image aesthetics type search constraint 432 that indicates a numerical value for the intensity of the image as 5.6 and a weight 434 of +24. Thus, based on search stack 400, a search engine may generate search results that rank highly images that depict the Space Needle, with the sun setting to the west, where the images include a significant amount of orange pixels with an intensity value approximately 5.6.

FIG. 4B illustrates still another search stack 450 that is consistent with the various embodiments presented herein. For instance, a user may have shared stack 400 of FIG. 4B with another user. The other user may access the shared search stack and edit search stack 400 to generate search stack 450. For search stack 450, the other user has edited base search constraint 404 to include an alternative example image that depicts the Golden Gate Bridge, located in San Francisco, Calif. (in contrast to the Space Needle). Thus, the edited and re-purposed search stack 450 may be employed to generate search results search that rank highly images that depict the Golden Gate Bridge, with the sun setting to the west, where the images include a significant amount of orange pixels with an intensity value approximately 5.6.

Generalized Processes for Searching Digital Content

Although processes 500-800 of FIGS. 5-8 are discussed in the context of searching digital image content, it should be understood that the various embodiments are not so limited. That is, one of ordinary skill in the art would understand how the following discussion of processes 500-800 may be readily adapted for searching other forms of digital content, such as but not limited to digital audio content, digital video content, digital multimedia content, textual documents, and the like. Processes 500-800, or portions thereof, may be performed and/or executed by any computing device, such as but not limited to user computing devices 102-114 and server computing device 116 of FIG. 1A, as well as computing device 900 of FIG. 9. Additionally, search engine, such as but not limited to search engine 122 of FIG. 1A, may perform and/or execute at least portions of processes 500-800. A search client, such as but not limited to search client 124 of FIG. 1A, may perform and/or execute at least portions of processes 500-800.

Figure 5:
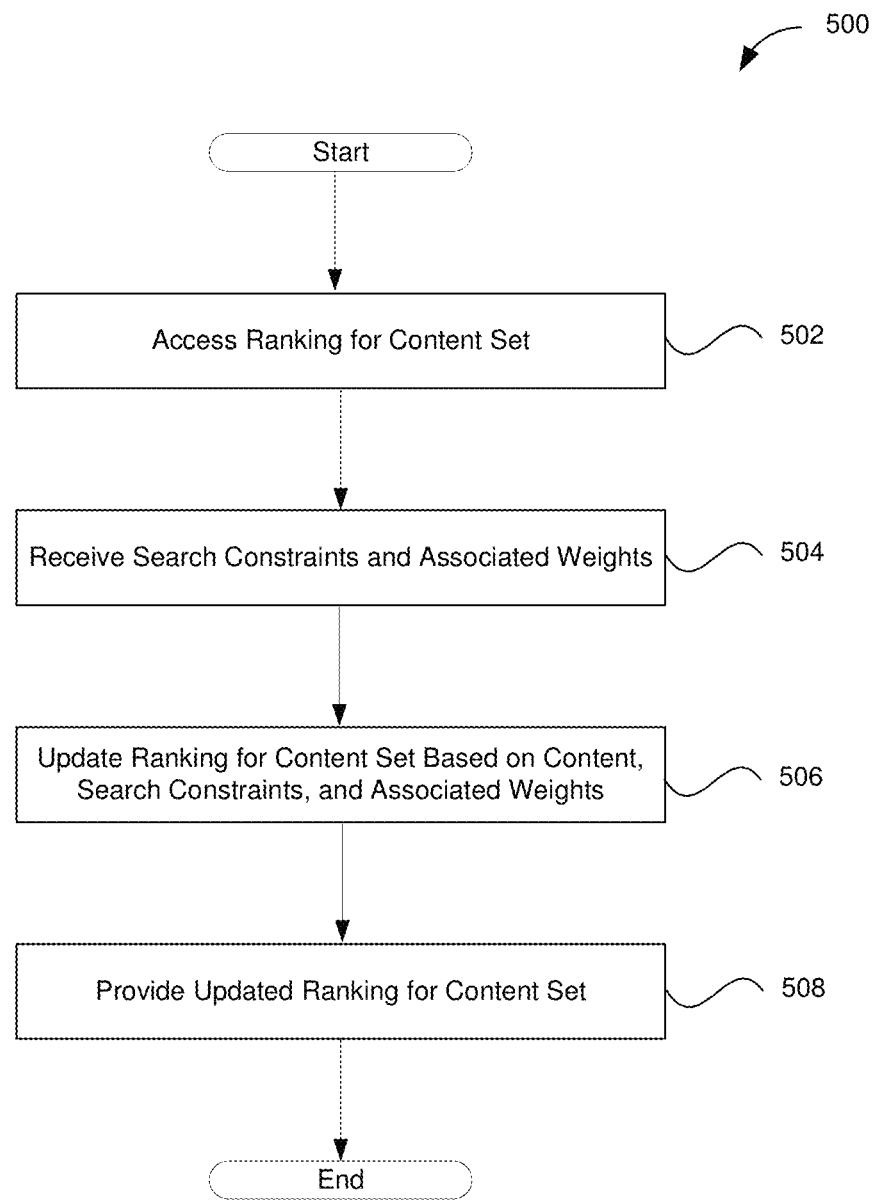
FIG. 5 illustrates one embodiment of an enhanced process flow for ranking a set of content that is consistent with the various embodiments presented herein

FIG. 5 illustrates one embodiment of an enhanced process flow for ranking a set of content that is consistent with the various embodiments presented herein. Process 500 begins, after a start block, at block 502 where a ranking for a content set (or set of content) is accessed. For instance, a search engine, such as but not limited to enhanced search engine 122 of FIG. 1A, may provide a ranked (or ordered) list, set, or sequence of content items. The ranking of the set of content may be based on an initial search. For example, the content items and/or the ranking of the content items of the set may be based on a base constraint of a base layer of a search stack, such as but not limited to search stack 250 of FIG. 2B. The ranking of the content set may be accessed via other means. For instance, a third party search engine may provide the ranking of a content set at block 502.

As a non-limiting example, the content set may contain M items of content, where M is any positive integer. A relevancy score may be associated with each content item. The relevancy score for each item may be determined via the base layer constraint. The accessed initial ranking of the items may be based on the relevancy score for the content items, e.g., the content item with the highest relevancy score may by ranked as the highest ranked item. The content item with the lowest relevancy score may be ranked as the lowest ranked item. The intermediate content items correspondingly ranked between the highest and lowest ranked items based on corresponding relevancy scores. The accessed rankings for the jth content item may be represented as $r_{0,j}$, where j is a positive integer such that j=1, 2, . . . , M and the 0 subscript indicates that relevancy score is for the initially accessed ranking of the content.

Thus, accessing the ranking of the content set at block 502 may include accessing and/or receiving each of the relevancy scores for each content item included in the content set. The relevancy score may be any metric generated by a search engine (or other means) that indicates a measure of relevancy or priority to a search constraint or condition of the content item. In some embodiments, the relevancy score is simply the ranked position of the item content. In at least one embodiment, only an unordered list of the content items included in the content set is accessed and/or received at block 502. That is, the initial content set is not ranked based on a relevancy to a search constraint.

At block 504, one or more search constraints and associated weights are received. For instance, a user may provide search constraints and associated weights via a search user interface (UI), such as but not limited to enhanced search UI 300 of FIG. 3. Each received search constraint may include similar features or components to search constraint 210 of FIG. 2A. Additionally, for each received search constraint, an associated weight, such as but not limited to weight 220 of FIG. 2A, may be received. Thus, the received search constraint-weight pair may be structured, configured, or arranged as a search constraint layer, such as but not limited to search constraint layer 200 of FIG. 2A. A plurality of such received search constraint layers may be structured, configured, and/or arranged as at least a portion of a search stack such as but not limited to search stack 250 of FIG. 2B. A user may generate such a search stack via UI 300.

As a non-limiting example, N search constraints and associated weights may be received at block 504, where N is a positive integer. Each of the associated weight values may be represented as $w_i$, where i is a positive integer such that i=1, 2 . . . , N. As discussed throughout, the weight values may be appropriately scaled to virtually any predefined range. In a non-limiting embodiment, $-100 \leq w_j \leq +100$. In various embodiments, a base weight ($w_0$) is associated with the initially accessed ranking of the content set of block 502. $w_0$ may be set to a default value, such as but not limited to the maximum weight value. Thus, in some embodiments, $w_0=+100$. In some embodiments, the value of $w_0$ is fixed or held constant at the default value. In other embodiments, the value of $w_0$ may be adjusted or modified by the user via UI 300.

At block 506, the ranking of the content set is updated based on the items of content included in the content set, the received search constraints, and the associated weights. In some embodiments a search engine, such as but not limited to enhanced search engine 122 of FIG. 1A may be employed to determine a relevancy score for each of the content items for each of the search constraints received at block 504. The relevancy score for each constraint for a particular content item may be based on a relevancy of the particular content item to the search constraint. Thus, the relevancy score may be based on a relevancy of metadata associated with the particular item to the search constraint. For instance, metadata, such as but not limited to image metadata 160 of FIG. 1B, may be employed to generate the relevancy scores at block 506.

The relevancy scores determined at block 506 may be indicated as $r_{i,j}$, where the subscript i indicates the ith received search constraint (i=1, 2, . . . , N) and the subscript j indicates the jth content item (j=1, 2, . . . , M). In various embodiments, an updated relevancy score ($\hat{r}_j$) is determined for each content item at block 506. The updated ranking of the content set may be based on the updated relevancy score for each content item, i.e., $\hat{r}_j$. In some embodiments, the updated relevancy score for the jth content item may be determined as $$\hat{r}_j = \frac{\sum_{i=0}^{N} w_i r_{i,j}}{\sum_{i=0}^{N} |w_i|}$$

The relevancy (and thus initial ranking) of the content set to a base layer constraint is accounted for by extending the summation of the subscript i to include the i=0 terms. In other embodiments, the summation is only carried out over i=1 to N, or equivalently, the value of $w_0$ is set to 0.0. Thus, in some embodiments, the initial ranking of the content set does not affect the updated ranking at block 506. It should be understood that other weighted ranking metrics may be employed to determine the updated rankings.

In the context of images as described throughout, each image may be characterized by embedding the image within a vector space. The relevancy score ($r_{i,j}$) of the jth image for the ith search constraint may be based on the position of the image within the vector space. The jth search constraint may correspond to a particular position or location within the vector space. As such, the relevancy score may be based on the components of the vector representing the image within the vector space and the components of the vector representing the position of the jth search constraint in the vector space. For instance, the relevancy score for a particular image may be based on the "distance" between the search constraint and the particular image within the vector space. For an image similarity (or search by example) search constraint, the relevancy score may be based on the "distance" between two images within the vector space.

At block 508, at least a portion of the updated ranking of the content set is provided to the user. For instance, search results window 312 of UI 300 may be employed to provide the updated ranking of the content set. In some embodiments, only a predefined number of the highest re-ranked content items are provided to the user, such as but not limited to the highest ranked 10, 20, 50, or 100 content items. Process 500 may terminate after block 508.

Figure 6:
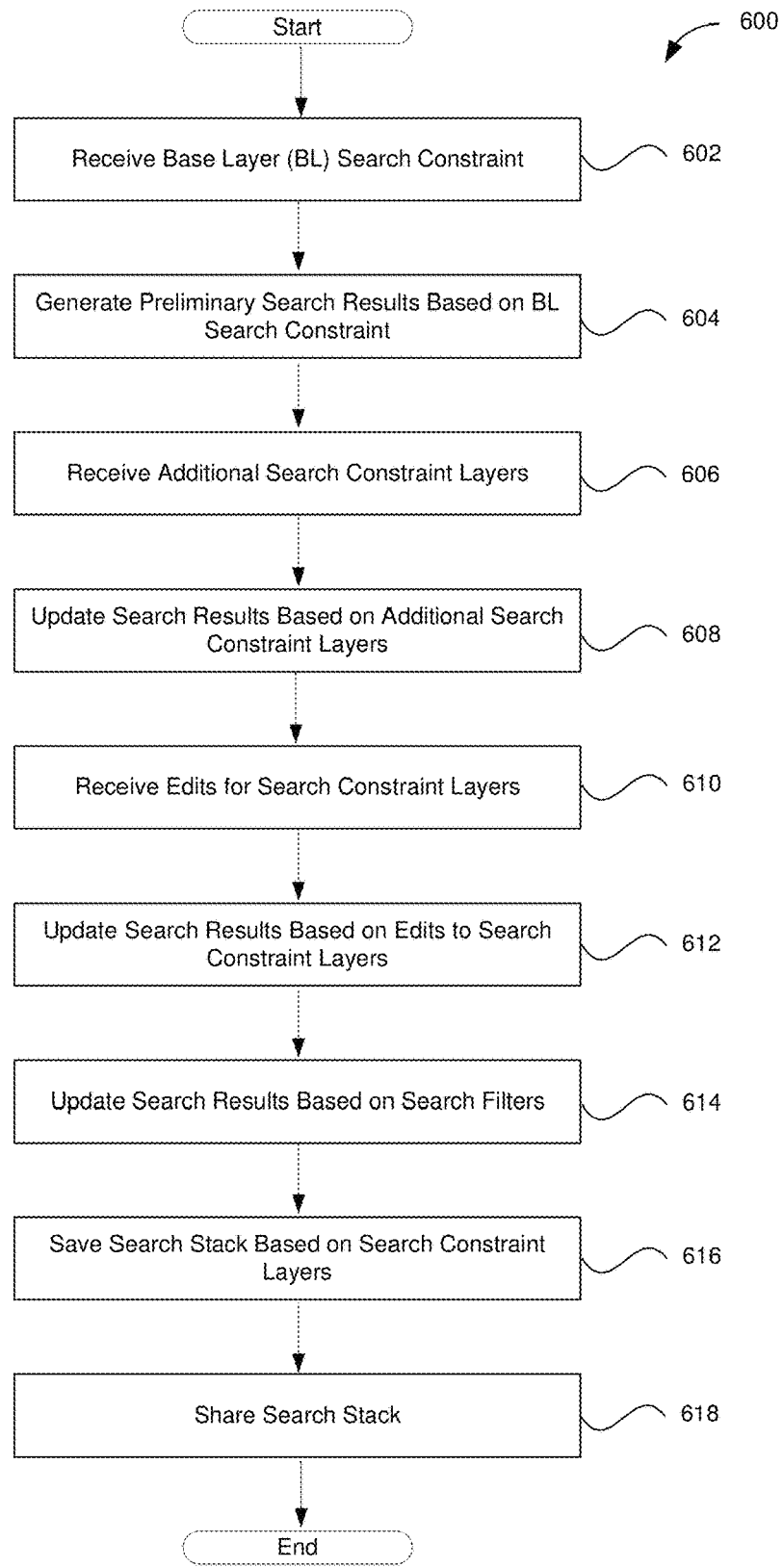
FIG. 6 illustrates one embodiment of an enhanced process flow for searching that is consistent with the various embodiments presented herein.

FIG. 6 illustrates one embodiment of an enhanced process flow for searching that is consistent with the various embodiments presented herein. Process 600 begins after a start block, at block 602 where a base layer search constraint is received. UI 300 of FIG. 3 may be employed by a user to provide the base layer search constraint to a search client, such as but not limited to search client 124. The base layer search constraint may be similar base layer search constraint 262 of FIG. 2B. A user may provide a base layer weight, such as but not limited to base layer weight 264 of FIG. 2B, at block 602. In other embodiments, a base layer weight is set to a default value, such as but not limited to a maximum weight value at block 602. Thus, at block 602, a base layer search constraint, such as but not limited to base layer 260, is received via a search UI. The base layer search constraint may be provided by the search client and received by a search engine, such as but not limited to enhanced search engine 122 of FIG. 1A.

At block 604, preliminary search results are generated based on the base layer search constraint received at block. The search engine may generate the preliminary search results. The preliminary search results may include a ranked or ordered content set, similar to the ranked content set accessed at block 502 of process of FIG. 5. Thus, each content item included in the preliminary search results may be associated with a relevancy score based on the item's relevancy to the base layer search constraint (e.g., $r_{0,j}$). At least a portion of the highest ranked content items included in the preliminary search results may be provided to the user via search results window 312 of search UI 300.

At block 606, additional search constraint layers may be received. Each of the additional search constraint layers may be similar to search constraint layer 200 of FIG. 2A. Thus, each received additional search constraint layer may include at least a search constraint and a weight. The additional search constraint layers may be received by the search engine. A user may employ the search UI to define each additional search constraint layers and provide the layers to the search engine.

At block 608, the preliminary search results are updated based on the additional search constraint layers received at block 606. Updating the search results may include re-ranking or re-prioritizing the search results. Various embodiments for updating the ranking of the search results are discussed at least in conjunction with at least block 506 of process 500. However, briefly here, updating the search results may include determining a relevancy score for each content item and for each search constraint, e.g., $r_{i,j}$. An updated relevancy score (or ranking score) for each item ($\hat{r}_j$) may be determine based on $\hat{r}_{i,j}$ and the weights for each search constraint layer ($w_i$). The updated search results, including the updated ranking, may be based on the updated relevancy score for each item. Because the content items are re-ranked at block 608, each content item included in the preliminary search results of block 604 is included in the updated search results of block 608, i.e., low ranked content items may not be filtered and/or deleted from the updated search results. As such, the search results need not be culled based on additional search constraints that would conventionally overly constrain or narrow the search results. At least a portion of the updated search results, including the re-ranking of the search results, may be provided to the user at block 608. For example, the 25 highest re-ranked content items may be provided to the user via the search UI.

At block 610, the user may edit the one or more of the search constraint layers (including the base layer), and the constraint layer edits are received. The user may employ the search UI to provide edits to the search constraint layers. For instance, the user may adjust or modify the weight for one or more of the search constraint layers. The user may edit one or more values or the type one or more search constraint layers at block 610. The user may add or delete search constraint layers at block 610. The user may enable or disable one or more individual search constraint layers at block 610.

At block 612, the search results are updated based on the edits to the one or more search constraint layers. Updating the search results at block 612 may include updating the ranking of the search results based on the edits to the search constraint layers. Various embodiments for updating search results based on search constraint layers are discussed throughout, including at least in conjunction with block 608. At least a portion of the updated search results may be provided to the user at block 612.

At block 614, the search results may be further updated based on one or more search filters. For instance, the user may employ the search UI to provide one or more search filters. Updating the search results at block 614 may include filtering out, or deleting, one or more content items from the search results based on a relevancy to the filters. The filtered search results may be re-ranked and provided to the user.

At block 616, a search stack is generated and/or saved based on the search constraint layers and/or the optional filters. A search stack generated/saved at block 616 may be similar to any of the search stacks discussed throughout, including but not limited to search stack 250 of FIG. 2A, search stack 400 of FIG. 4A, or search stack 450 of FIG. 4B. The search stack may be generated and saved as structured or unstructured data. In at least one embodiment, at least a portion of the updated search results are saved in conjunction with the search stack.

At block 618, the user shares the search stack. For instance, the user may share the search stack (and/or the updated search results) with another user via email, a social platform or network, or some other means of sharing digital structured or unstructured data. As discussed in conjunction with at least process 700 of FIG. 7, the other user may open or otherwise access the shared search stack. The other user may continue to edit the search stack, add/delete search constraint layers to the stack, and the like, as well as view updated search results and re-save and/or re-purpose the edited search stack. Process 600 may terminate after block 618.

Figure 7:
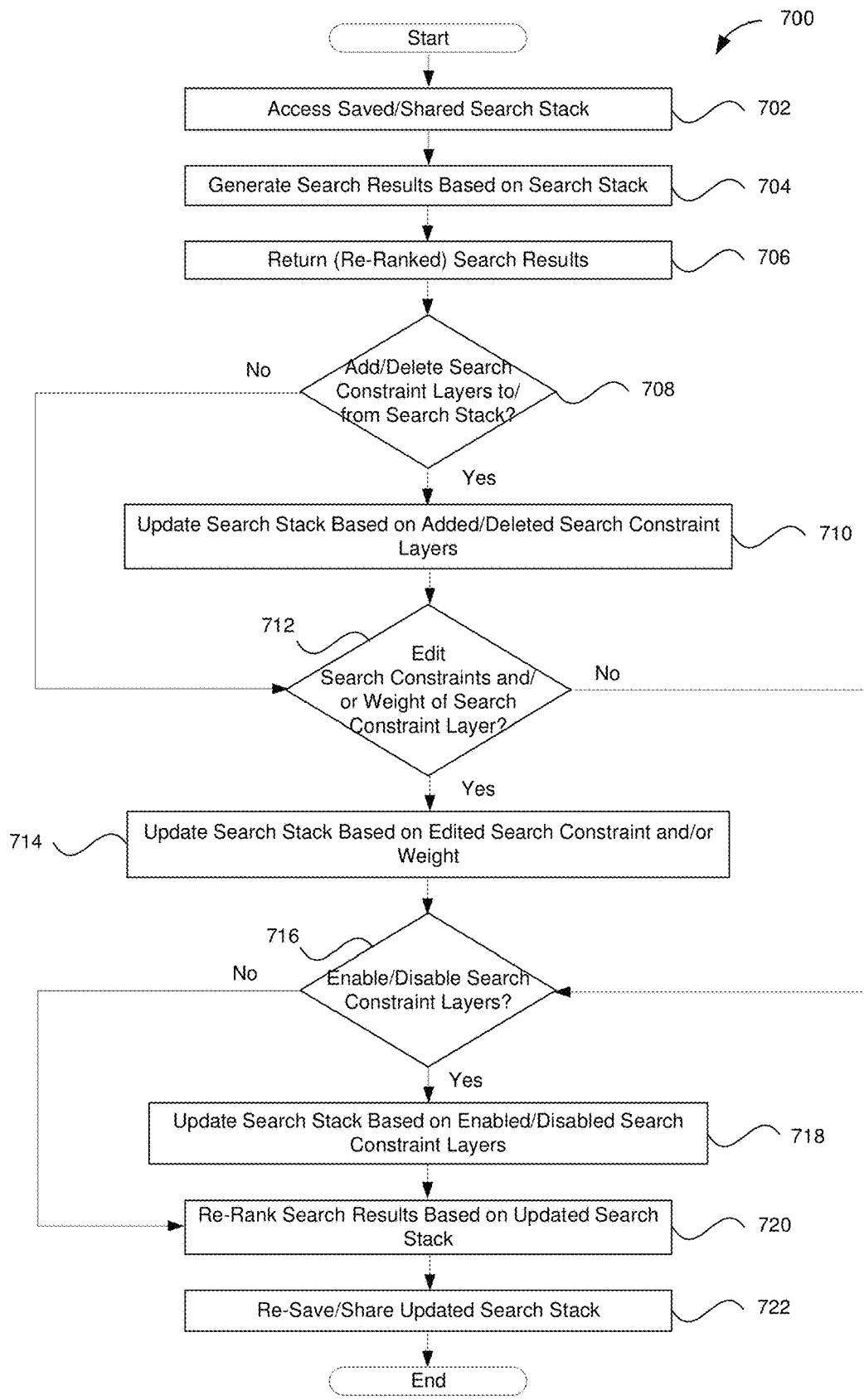
FIG. 7 illustrates another embodiment of an enhanced process flow for searching that is consistent with the various embodiments presented herein.

FIG. 7 illustrates another embodiment of an enhanced process flow for searching that is consistent with the various embodiments presented herein. Process 700 begins after a start block, at block 702, where a saved and/or shared search stack is access and/or opened. For instance, a user may employ a search UI, such as but not limited to UI 300 of FIG. 3, to open a previously saved or shared search stack. The accessed search stack may be similar to any of the search stacks discussed herein, including but not limited to search stack 250 of FIG. 2B, search stack 400 of FIG. 4A, or search stack 450 of FIG. 4B. Accordingly, the accessed search stack may include one or more search constraint layers, such as but not limited to search constraint layer 200 of FIG. 2A. The accessed search stack includes at least a base search constraint layer. As discussed in conjunction with FIG. 2B, the base constraint layer may include at least a base search constraint and an associated base or default weight.

At block 704, search results are generated based on the search stack. Thus, search results may be generated based on the search constraints and associated weights of the search constraint. A search engine, such as but not limited to enhanced search engine 122 of FIG. 1A, may generate the search results. Various embodiments of generating search results based on search constraints and associated weights are discussed throughout, including at least in conjunction with process 500 of FIG. 5 and process 600 of FIG. 6. However, briefly, at block 704, preliminary or initial search results may be generated based on the base search constraint layer included in the search stack. Such preliminary search results may include a preliminary or initial ranking. A ranking (or re-ranking) of the search results may be based at least on the base search constraint layer, the additional search constraint layers, and the associated weights. At block 706, the (re-)ranked search results are returned to the user. For example, the search UI 300 may return the re-ranked search results to the user via search results window 312.

At decision block 708, it is determined whether to add and/or delete search constraint layers to/from the search stack. For instance, the user may add or delete layers to the search stack via search UI 300. If no search constraint layers are added or deleted to/from the search stack, process 700 flows to decision block 712. Otherwise, process 700 flows to block 710. At block 710, the search stack is updated based on the added/deleted layers.

At decision block 712, it is determined whether to edit the search constraints and/or weights of one or more search constraint layers currently included in the search stack. For instance, a user may employ search UI to update the search constraint values or types, as well as the associated weight for any search constraint layer currently included in the search stack. If no edits are provided to the search constraint layers, process 700 flows to decision block 716. Otherwise, process 700 flows to block 714. At block 714, the search stack is updated based on the edits to the search constraints or the weights to the one or more search constraint layers.

At decision block 716, it is determined whether to enable and/or disable one or more search constraint layers currently included in the search stack. For instance, a user may employ search UI to enable/disable any of the search constraint layers currently included in the search stack. If no search constraint layers are toggled on/off (i.e., enabled/disabled) at block 716, process 700 flows to block 720. Otherwise, process 700 flows to block 718. At block 718, the search stack is updated based on enabling or disabling one or more of the search constraint layers. In at least one embodiment, when a search constraint layer is disabled (or tuned off), updating the search stack includes updating the weight of the search constraint layer to be equal to 0.0. Conversely, when a search constraint layer is enabled (or tuned on), updating the search stack includes updating the weight of the search constraint layer to be equal to the value it was previously set at, prior to being set to 0.0.

At block 720, the search results are re-ranked (or re-ordered) based on the updated search stack. Various embodiments for re-ranking search results based on a search stack are discussed throughout. The re-ranked search results may be provided to the user at block 720. At block 722, the updated search stack may be re-saved or shared. For example, the user may employ search UI 300 to save or share the updated search stack. Process 700 may terminate after block 722.

Figure 8:
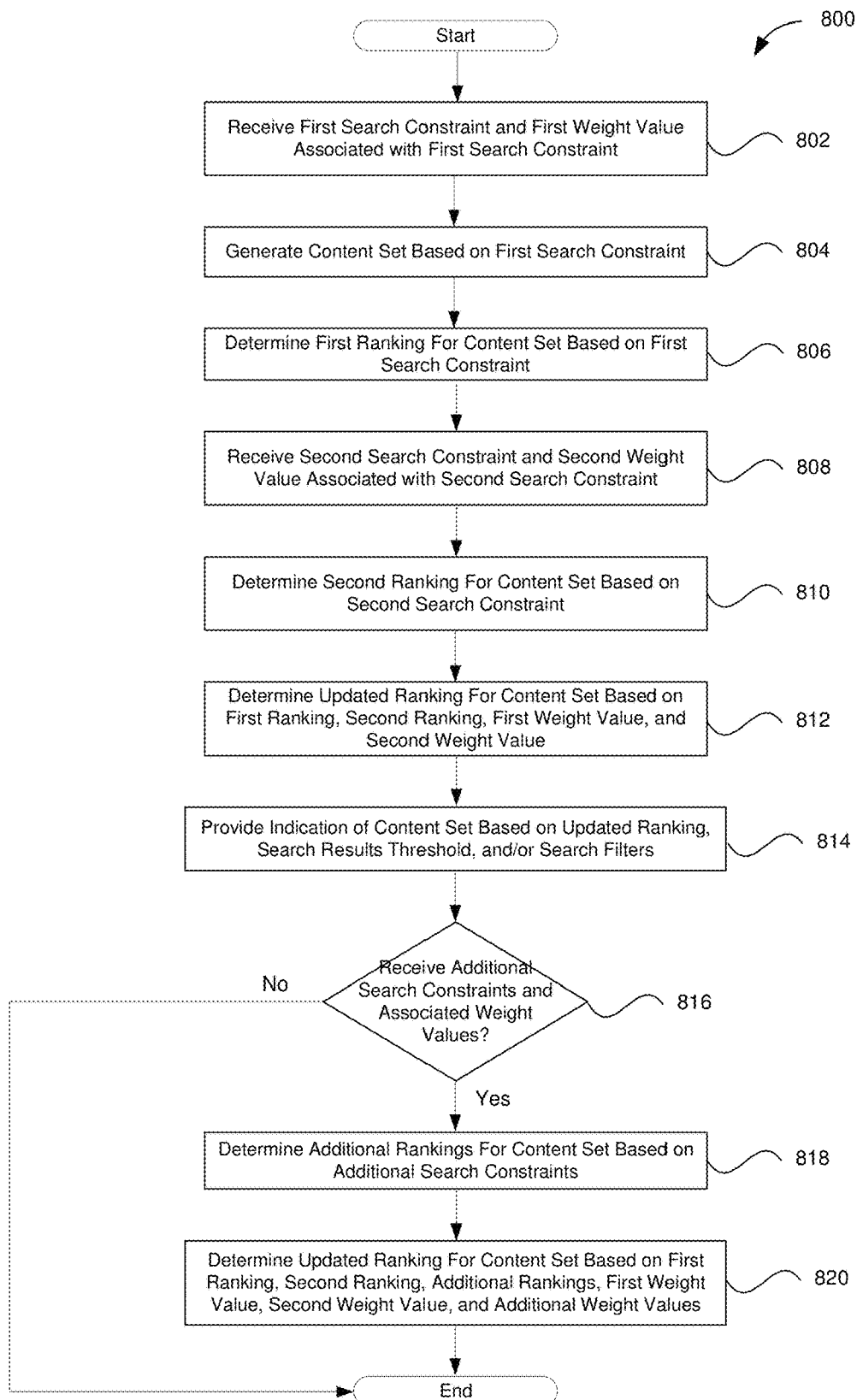
FIG. 8 illustrates still another embodiment of an enhanced process flow for searching that is consistent with the various embodiments presented herein.

FIG. 8 illustrates still another embodiment of an enhanced process flow for searching that is consistent with the various embodiments presented herein. Process 800 begins, after a start block, at block 802 where a first search constraint and a first weight value associated with the first search constraint are received. The first search constraint and associated first weight may be received at a search engine, such as but not limited to search engine 122 of FIG. 1A. The first constraint and associated first weight value may be configured or structured as a search constraint layer, such as but not limited to a first search constraint layer that is similar to search constraint layer 200 of FIG. 2A. In at least one embodiment, the first search constraint layer is configured or structured as a base search constraint layer, such as but not limited to base layer 260 of FIG. 2B. As such, in some embodiments, no first weight value is received at block 802. Rather, in these embodiments, the first weight value is set to a default base weight value, such as but not limited to a maximum weight value. In at least one embodiment, the default base weight value is +100.0. The first weight value may be indicated as $w_0$.

At block 804, a content set is generated based on the first search constraint. The content set includes one or more items of searchable content. In various embodiments, search results are generated at block 804 via the search engine. As discussed throughout, each content item included in the search results is at least somewhat relevant to the first constraint. At block 806, a first ranking of the content set is determined based on the first search constraint. For instance, in blocks 804 and 806, a search engine may generate a content set, such as but not limited to search results. The search engine may determine a first relevancy score ($r_{0,j}$) for each content item included in the content set, where the first relevancy score is based on the relevancy between the jth item and the first search constraint. The first ranking for the content set may be based on the set of first relevancy scores.

At block 808, a second search constraint and a second weight value ($w_i$) associated with the second search constraint are received. Similar to the first search constraint and associated first weight, the second search constraint and associated second weight may be provided by a search UI, such as but not limited to search UI 126 of FIG. 1A. The second constraint and associated second weight value may be configured or structured as a search constraint layer, such as but not limited to a second search constraint layer.

At block 810, a second ranking of the content set is determined based on the second search constraint. The search engine may determine a second relevancy score ($r_{i,j}$) for each content item included in the content set, where the second relevancy score is based on the relevancy between the jth item and the second search constraint. The second ranking for the content set may be based on the set of first relevancy scores.

At block 812, an updated ranking for the content set is determined based on the first ranking of the content set, the first weight value, the second ranking of the content set, and the second weight value. Thus, in some embodiments, the updated ranking of the content set is based on each of $r_{0,j}$ (for all j), $w_0$, $r_{1,j}$ (for all j), and $w_1$. At block 814, an indication of the content set is provide to the user. The indication may indicate the updated ranking of the content set. For instance, search UI 300 may show a listing of at least a portion of the highest ranked content items in the content set. The indication of the content set may be based on the updated ranking, one or more search result thresholds (for instance, only provide visual indications of the 10 highest ranked content items), or search filters provided by the user.

At decision block 816, it is determined whether additional search constraints and associated weights values ($w_i$ for i>1) are received. If no additional search constraints and additional weights values are received, process 800 may terminate. If additional search constraints and associated weight values are received, process 800 flows to block 818.

At block 818, additional rankings for the content set are determined based on the additional search constraints. For instance, the additional rankings may be based on additionally determined relevancy scores for the jth item ($r_{i,j}$), where i>1. At block 820, an updated ranking of the content set is determined based on the first ranking, the second ranking, the additional rankings, the first weight values, the second weight values, and the additional weight values. Thus, in some embodiments, the updated ranking of the content set, at block 820, is based on each of $r_{0,j}$ (for all j), $w_0$, $r_{1,j}$ (for all j), $w_1$, $r_{0,j}$ (for all j and i>1), and $w_i$ (for i>1). An indication of the updated ranking may be provided to the user. Process 800 may terminate after block 820.

Additional Embodiments

Although various embodiments have been described throughout, additional embodiments are disclosed in this section. One embodiment is directed towards a method that includes receiving a first search constraint and generating search results based on the first search constraint. A search constraint may include one or more search values, search criteria, or search conditions. The search results may include a ranked (via a relevancy score) set of digital images. In various embodiments, search results may include an ordered (or ranked) list of at least a portion of the images in the set of digital images. The search results, and more particularly the relevancy score of each image included in the set of digital images, may be based on a vector representation of the image within a vector space. A second search constraint and a weight value associated with the second search constraint are received. The search results are updated based on the second search constraint and the weight value associated with the second constraint. The updated search results are provided to a user. Updating the search results may include determining a ranking (or a re-ranking) for each item of content included in the search results. The ranking (or re-ranking) is based on the first search constraint, the second search constraint, and the weight value associated with the second search constraint. In at least one embodiment, updating the search results may further be based on a weight value associated with the first search constraint, such as a default weight value or a maximum weight value.

The method may further include determining a first ranking for the search results based on the first search constraint and determining a second ranking for the search results based on the second search constraint. An updated ranking for the search results is determined based on a combination of the first ranking, the second ranking, the weight value associated with the second search constraint, and the weight value associated with the first search constraint.

A search constraint may include an image aesthetic search constraint, as well as an image similarity search constraint or a search by example search constraint. An image similarity or a search by example search constraint may include example image content, video content, audio content, or the like, i.e., a sample of digital content. The relevant similarity may be associated with any aspect or property of the sample digital content. For instance, the similarity may be a machine-vision based similarity, a color similarity, or an image aesthetic-based similarity between the searched image and the sample image.

A search constraint may include a color search constraint. A color search constraint may include a color value and/or a color dominance value. A color dominance value indicates an absolute or a relative minimum and/or maximum number of pixels included in an image that represent a color that has a relationship to the color value. For instance, color dominance values may indicate a range of the percentage of pixels in an image that display colors similar to the color value of the color search constraint.

The method may further include structuring, configuring, or arranging the first search constraint and another weight value associated with the first search constraint in a first constraint layer. The first constraint layer may be a base search layer. The other weight value may be a default weight value, a maximum weight value, or minimum weight value. The second constraint and the weight value associated with the second search constraint are structured, configured, or arranged in a second search constraint layer. The first constraint layer and the second search constraint layer are structured, configured, or arranged in a layered search stack. The layering of the search stack is based on the weight value associated with the second search constraint and the other weight value associated with the first search constraint. The search stack may include structured or unstructured data. The search stack may be saved and/or shared with (i.e., provided to) another user. For instance, the user may share the search stack with a friend via a social network or social platform.

Another method includes steps for accessing image search results based on a base search constraint, steps for receiving additional search constraints and a separate weight for each of the additional search constraints, and steps for updating the search results. The search results, and more particularly the relevancy score of each image included in the image search results, may be based on a vector representation of the image within a vector space. Updating the search results may include steps for updating a ranking of the search results. The search results indicate and/or include a plurality of images. The steps for updating the ranking of the search results may include updating a ranking of each of the plurality of images based on the base search constraint, the additional search constraints, and the weights associated with each of the additional search constraints.

The steps for accessing the image search results may include receiving the base search constraint and determining whether to include an image in the search results and a ranking for each of the included images based on a relevancy of the images to the base search constraint. The steps may also include providing an indication of the ranking of at least a portion of the included images to user.

The steps for receiving additional search constraints and a separate weight for each of the additional search constraints include providing a search user interface (UI) to a user, receiving, at a search engine, a first search constraint and a first weight associated with the first search constraint. The steps also include receiving, at the search engine, a second constraint and a second weight associated with the second search constraint. The user may have employed the search UI to select the first search constraint, the first weight, the second search constraint, or the second weight.

The steps for updating the ranking of the images may include receiving a base relevancy score for each of the plurality of images. The base relevancy score for a particular image indicates a relevancy of the particular image to the base search constraint. The steps also include determining a first relevancy score for each of the images. The first relevancy score for the particular image indicates a relevancy of the particular image to a first search constraint of the received additional constraints. An updated relevancy score for each of the images is determined. The updated relevancy score for a particular image is based on a combination of the base relevancy score of the particular image, the first relevancy score of the particular image, a first weight associated with the first search constraint, and a base weight associated with the base search constraint. An updated ranking of the images is generated based on the updated relevancy score for the images. The base weight may be a default weight, such as but not limited to a maximum weight.

The updated ranking of the images is based on an automatically determined similarity between one or more objects, persons, or locations depicted in the images and another object, person, or location depicted in a sample image included in the base search constraint or in one of the additional search constraints. The updated ranking of the images may be based on a similarity between an automatically determined image aesthetic value of the images and another image aesthetic value included in the base search constraint or in one of the additional search constraints. The other image aesthetic values may be automatically determined and be included in a sample image included in the base search constraint or in one of the additional search constraints. The aesthetic value or the other aesthetic value may indicate at least one of a hue, saturation, lightness, or quantity of the image. The updated ranking of the images may be based on an automatically determined similarity between one or more automatically determined colors depicted in the images and another color automatically depicted in a sample image included in the base search constraint or in one of the additional search constraints.

Various embodiments include a computing system for searching digital content. The computing system includes at least a processor device and a non-transitory computer-readable storage medium that has instructions stored on it. The instructions provide the system with a search engine enabled to perform a method. The method includes actions such as receiving a base search constraint, generating preliminary (or initial) search results based on the base search constraint, and providing the preliminary search results. The preliminary search results include a preliminary (or initial) ranking of the search results. The preliminary ranking of the search results may be based on one or more components of a vector representation of each item of the search results that correspond to the base search constraint.

The actions also include receiving a first search layer and determining an updated ranking for the search results. The first search layer includes a first search constraint and a first weight. The updated ranking for the search results is based on a base weight associated with the base search constraint, the preliminary ranking of the search result, the first search constraint, and the first weight. The base weight may be a default or maximum weight. The first weight may be a negative weight. The method provides the updated ranking for the search results to the user.

The actions may further include receiving edits to the first search layer, such as a modification to the first search constraint or a modification to the first weight. An updated ranking for the search results is determined based on the edits to the first search constraint, and the updated ranking is provided to the user. A search stack that includes a base search layer and the first search layer is provided to (i.e., shared with) another user. The search stack may be saved. The base search layer includes the base search constraint and the base weight. Filters may be received and applied to the search results. After applying the filters, the filtered search results may be ranked and provided to the user. Individual layers of the search stack may be enabled or disabled. The ranking of the search results is updated based on disabling and enabling individual layers of the search stack.

Illustrative Computing Device

Figure 9:
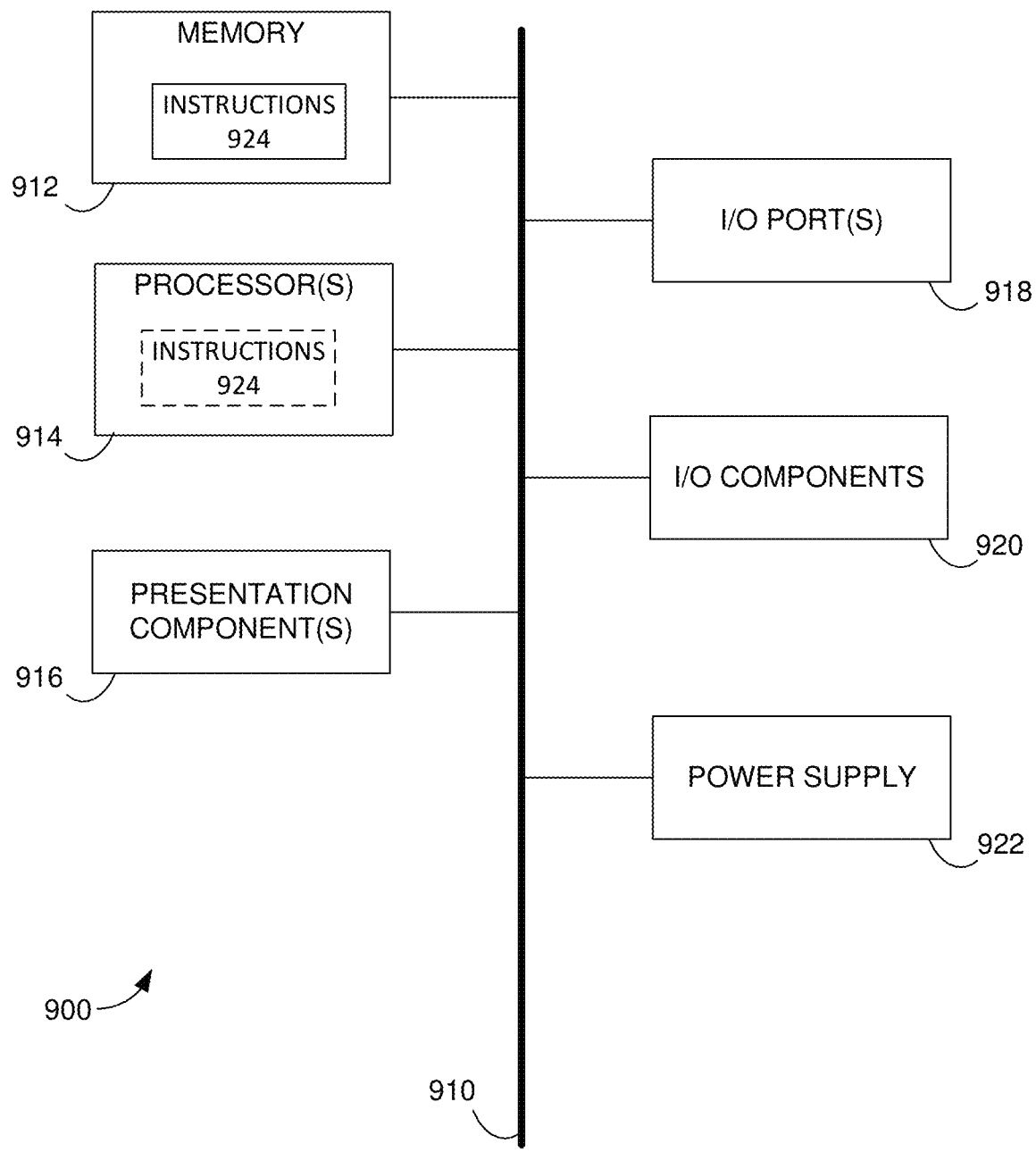
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)."

The phrase "at least one of A, B and C" means "(A), (B), (C), (A and B), (A and C), (B and C) or (A, B and C)."

What is claimed is:

1. A computer-readable storage medium having instructions stored thereon for searching content, which, when executed by a processor of a computing device cause the computing device to perform actions comprising:
   receiving a first search constraint for the content;
   embedding a vector representation of the first search constraint within a vector space;
   generating an initial set of search results based on the first search constraint, wherein the initial set of search results comprises content items that each correspond to vector representations of the content items;
   receiving a second search constraint and a user-defined weight value associated with the second search constraint;
   embedding a vector representation of the second search constraint and the user-defined weight value associated with the second search constraint within the vector space;
   generating a search stack vector based on a weighted combination of the vector representation of the first search constraint, the vector representation of the second search constraint and the user-defined weight value associated with the second search constraint;
   re-ranking each of the content items of the initial set of search results based on determining a distance between the search stack vector and each of the vector representations of the content items of the initial set of search results that were generated by the first search constraint; and
   providing the each of the content items of the initial set of search results in a new order as a re-ranked set of search results.

2. The computer-readable storage medium of claim 1, wherein the actions further comprise:
   determining a first ranking for the initial set of search results based on the first search constraint;
   determining a second ranking for the initial set of search results based on the second search constraint;
   determining an updated ranking for the initial set of search results based on a combination of the first ranking, the second ranking, the user-defined weight value associated with the second search constraint, and another user-defined weight value that is associated with the first search constraint.

3. The one or more computer-readable storage media of claim 1, wherein the first search constraint includes at least one of an image similarity search constraint or an image aesthetic search constraint.

4. The one or more computer-readable storage media of claim 1, wherein the second search constraint includes at a color value and one or more dominance values that indicate a maximum or a minimum relative number of pixels included in an image that represent a color that has a relationship to the color value.

5. The one or more computer-readable storage media of claim 1, the actions further comprise:
   arranging the first search constraint and another user-defined weight value associated with the first search constraint in a first search constraint layer;
   arranging the second constraint and the user-defined weight value associated with the second search constraint in a second search constraint layer;
   arranging the first search constraint layer and the second search constraint layer in the search stack vector based on the user-defined weight value associated with the second search constraint and the other user-defined weight value associated with the first search constraint, wherein the search stack vector is enabled to generate search results based on the arrangement of the first search constraint layer and the second search constraint layer;

using the search stack vector, including the first constraint layer and the second constraint layer, to generate search results; and saving the search stack vector.

6. The computer-readable storage medium of claim 1, wherein at least one of the first search constraint or the second search constraint is an example image, wherein a vector representation of the example image is embedded within the vector space.

7. The computer-readable storage medium of claim 6, wherein generating an initial set of search results is based on determining a distance between the vector representation of the example image and a plurality of vector representations of images in a searched database.

8. A method for searching images, comprising:
a step for receiving a first search constraint for the content;
a step for embedding a vector representation of the first search constraint within a vector space;
a step for generating an initial set of search results based on the first search constraint, wherein the initial set of search results comprises content items that each correspond to vector representations of the content items;
a step for receiving a second search constraint and a user-defined weight value associated with the second search constraint;
a step for embedding a vector representation of the second search constraint and the user-defined weight value associated with the second search constraint within the vector space;
a step for generating a search stack vector based on a weighted combination of the vector representation of the first search constraint, the vector representation of the second search constraint and the user-defined weight value associated with the second search constraint;
a step for re-ranking each of the content items of the initial set of search results based on determining a distance between the search stack vector and each of the vector representations of the content items of the initial set of search results that were generated by the first search constraint; and
a step for providing the each of the content items of the initial set of search results in a new order as a re-ranked set of search results.

9. The method for claim 8 further comprising,
determining to include each content item in the initial set of search results and a ranking of each content item of the initial set of search results based on a relevancy of each content item to the base first search constraint; and
providing an indication of the ranking of at least a portion of the content items of the initial set of search results for display.

10. The method of claim 8, wherein the steps for receiving the first search constraint and for receiving the second search constraint include:
providing a search user interface (UI) to a user;
receiving, at a search engine, the first search constraint and a user-defined weight value associated with the first search constraint; and receiving, at the search engine, the second search constraint and the user-defined weight associated with the second search constraint, wherein the user employs the search UI to select at least one of the first search constraint, the user-defined weight value associated with the first search constraint, the second search constraint, or the user-defined weight value associated with the second search constraint.

11. The method of claim 8, wherein the step for re-ranking each of the content items of the initial set of search results further comprises:
receiving a first relevancy score for each content item of the initial set of search results, wherein the first relevancy score for a particular content item of the initial set of search results indicates a relevancy of the particular content item to the first search constraint;
determining a second relevancy score for each of the content items of the initial set of search results, wherein the second relevancy score for the particular content item indicates a relevancy of the particular content item to the second search constraint;
determining an updated relevancy score for each of the content items of the initial set of search results, wherein the updated relevancy score for the particular content item is based on a combination of the first relevancy score of the particular content item, the second relevancy score of the particular content item, the user-defined weight associated with the second search constraint, and a base user-defined weight associated with the first search constraint; and
generating an updated ranking of each of the content items of the initial set of search results based on the updated relevancy score for each of the content items.

12. The method of claim 8, wherein re-ranking each of the content items is based on an automatically determined similarity between one or more objects, persons, or locations depicted in the vector representations of the content items and another object, person, or location depicted in a vector representation of a sample image included in the first search constraint or in one or more additional search constraints.

13. The method of claim 8, wherein re-ranking each of the content items is based on a similarity between an automatically determined image aesthetic value of each of the content items and another image aesthetic value included in the first search constraint or in one or more additional search constraints.

14. The method of claim 13, wherein the automatically determined aesthetic value of each of the content items indicates at least one of a hue, saturation, lightness, or quantity of the content item.

15. A computing system for searching digital content, comprising:
a processor device; and
a computer-readable storage medium, coupled with the processor device, having instructions stored thereon, which, when executed by the processor device, provide the system with a search engine configured to perform actions comprising:
receiving a base search constraint;
generating preliminary search results based on the base search constraint, wherein the preliminary search results include a preliminary ranking of the search results based on one or more components of a vector representation of each item included the search results that correspond to the base search constraint;
providing the preliminary search results, including the preliminary ranking of the search results, to a user;

receiving a first search constraint and a first user-defined weight, wherein a first search layer having the first search constraint and the first user-defined weight is embedded within a vector space;

generating a search stack vector based on a combination of a vector representation of a base search layer having the base search constraint and a base weight and a vector representation of the first search layer having the first search constraint and the first user-defined weight;

determining an updated ranking for the preliminary search results based on a distance between the search stack vector and the one or more components of the vector representation of each item of the preliminary search results that were generated based on the base search constraint; and providing the updated ranking for the search results to the user.

16. The computing system of claim 15, the actions further comprising:

receiving one or more edits to the first search layer, wherein the one or more edits includes at least a modification to the first search constraint or a modification to the first user-defined weight;

determining the updated ranking for the search results based on the base weight, the preliminary ranking of the search result, and the one or more edits to the first search layer; and providing at least a portion of the updated ranking for the search results to the user.

17. The computing system of claim 15, the actions further comprising:

providing to another user, as structured data, the search stack vector, wherein the search stack vector is enabled to generate search results based on the arrangement of the base search layer and the first search layer.

18. The computing system of claim 15, the actions further comprising:

receiving one or more search filters;

filtering the search results based on the one or more received filters;

determining the updated ranking for the filtered search results; and providing the updated ranking for the filtered search results to the user.

19. The computing system of claim 15, the actions further comprising:

receiving a second search layer that includes a second search constraint and a second user-defined weight;

determining the updated ranking for the search results based on the base weight, the preliminary ranking of the search result, the first search constraint, the first user-defined weight, the second search constraint, and the second user-defined weight; and providing the updated ranking for the search results to the user.

20. The computing system of claim 19, the actions further comprising:

receiving an indication to disable the first search layer;

determining the updated ranking for the search results based on the base weight, the preliminary ranking of the search result, the second search constraint, and the second user-defined weight; and providing the updated ranking for the search results to the user.

* * * * *

UNITED STATES PATENT AND TRADEMARK OFFICE
CERTIFICATE OF CORRECTION

PATENT NO. : 11,030,236 B2
APPLICATION NO. : 15/824836
DATED : June 8, 2021
INVENTOR(S) : Samarth Gulati et al.

Page 1 of 1

It is certified that error appears in the above-identified patent and that said Letters Patent is hereby corrected as shown below:

In the Claims

In Column 29, Line 53, Claim 9, delete "comprising," and insert -- comprising --, therefor.

In Column 29, Line 57, Claim 9, before "first" delete "base".

In Column 30, Line 29, Claim 11, after "a" delete "base".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*